US009843890B2

(12) United States Patent
Do et al.

(10) Patent No.: US 9,843,890 B2
(45) Date of Patent: Dec. 12, 2017

(54) RELIABILITY IN MOBILE DEVICE POSITIONING IN A CROWDSOURCING SYSTEM

(71) Applicant: QUALCOMM Incorporated, San Diego, CA (US)

(72) Inventors: Ju-yong Do, Cupertino, CA (US); Meghna Agrawal, Sunnyvale, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/074,481

(22) Filed: Mar. 18, 2016

(65) Prior Publication Data

US 2017/0272900 A1   Sep. 21, 2017

(51) Int. Cl.
*H04W 24/00* (2009.01)
*H04W 4/02* (2009.01)
*H04W 4/18* (2009.01)

(52) U.S. Cl.
CPC ............ *H04W 4/02* (2013.01); *H04W 4/185* (2013.01)

(58) Field of Classification Search
CPC ..... H04W 36/30; H04W 36/32; H04W 64/00; H04W 72/0426; H04W 88/08;
(Continued)

(56) References Cited

U.S. PATENT DOCUMENTS

| 7,551,579 | B2 | 6/2009 | Alizadeh-Shabdiz et al. |
| 2004/0038685 | A1* | 2/2004 | Nakabayashi ........ H04L 1/0017 455/452.2 |

(Continued)

FOREIGN PATENT DOCUMENTS

| WO | WO-2005029902 A1 | 3/2005 |
| WO | WO-2012035190 A1 | 3/2012 |

(Continued)

OTHER PUBLICATIONS

International Search Report and Written Opinion—PCT/US2017/018404—ISA/EPO—Jun. 02, 2017 (154856WO).

*Primary Examiner* — Joseph Arevalo
(74) *Attorney, Agent, or Firm* — Muncy, Geissler, Olds & Lowe, P.C.

(57) ABSTRACT

Methods and systems are disclosed for improving reliability in mobile device positioning. A mobile device generates position data for a device, receives a first access point position reliability state associated with the first access point, determines a reliability of the position data based on the first access point position reliability state and an estimated location of the first access point, determines a threshold reliability requirement of an application associated with the mobile device, compares the reliability of the position data to the threshold reliability requirement of the application, and provides the position data of the device based on the comparison. A network entity determines access point characteristics associated with an access point, generates a position reliability state for the access point, sends the position reliability state to a mobile device, receives position data associated with the mobile device, and determines a trustworthiness of the position data.

11 Claims, 12 Drawing Sheets

(58) Field of Classification Search
CPC ..... H04W 16/02; H04W 24/02; H04W 36/14; H04W 36/245; H04W 4/008; H04W 72/082
USPC ....... 455/67.11, 452.2, 436, 418, 435.1, 411, 455/456.1, 513
See application file for complete search history.

(56) References Cited

U.S. PATENT DOCUMENTS

| | | | |
|---|---|---|---|
| 2004/0160909 A1 | 8/2004 | Sheynblat | |
| 2005/0124355 A1 | 6/2005 | Cromer et al. | |
| 2007/0121560 A1 | 5/2007 | Edge | |
| 2008/0318596 A1 | 12/2008 | Tenny | |
| 2011/0143793 A1* | 6/2011 | Kim | H04B 7/024 455/501 |
| 2011/0183626 A1 | 7/2011 | Das et al. | |
| 2011/0250903 A1 | 10/2011 | Huang et al. | |
| 2013/0267241 A1* | 10/2013 | Baek | H04W 72/087 455/452.2 |
| 2013/0267242 A1 | 10/2013 | Curticapean et al. | |
| 2014/0080506 A1* | 3/2014 | Siomina | H04W 64/00 455/456.1 |
| 2014/0140227 A1 | 5/2014 | Gao et al. | |
| 2014/0233472 A1* | 8/2014 | Kadel | H04W 4/028 370/329 |
| 2015/0146553 A1 | 5/2015 | Emadzadeh et al. | |
| 2015/0172863 A1 | 6/2015 | Brachet et al. | |
| 2017/0026983 A1* | 1/2017 | Murakami | H04W 4/04 |

FOREIGN PATENT DOCUMENTS

| | | |
|---|---|---|
| WO | WO-2013150344 A1 | 10/2013 |
| WO | 2014042744 A1 | 3/2014 |

\* cited by examiner

RELIABILITY IN MOBILE DEVICE POSITIONING IN A CROWDSOURCING SYSTEM

INTRODUCTION

Aspects of this disclosure relate generally to telecommunications, and more particularly to improving reliability in mobile device positioning in a crowdsourcing system and the like.

Mobile communications networks are in the process of offering increasingly sophisticated capabilities associated with the motion and/or position location sensing of a mobile device. New software applications, such as, for example, those related to personal productivity, collaborative communications, social networking, and/or data acquisition, may utilize motion and/or position sensors to provide new features and services to consumers. Moreover, some regulatory requirements of various jurisdictions may require a network operator to report the location of a mobile device when the mobile device places a call to an emergency service, such as an E911 call in the United States.

Such motion and/or position determination capabilities have conventionally been provided using digital cellular positioning techniques and/or Satellite Positioning Systems (SPS). Additionally, with the increasing proliferation of miniaturized motion sensors (e.g., simple switches, accelerometers, angle sensors, etc.), such on-board devices may be used to provide relative position, velocity, acceleration, and/or orientation information.

In conventional digital cellular networks, position location capability can be provided by various time and/or phase measurement techniques. For example, in code division multiple access (CDMA) networks, one position determination approach used is Advanced Forward Link Trilateration (AFLT). Using AFLT, a mobile device may compute its position from phase measurements of pilot signals transmitted from a plurality of base stations. Improvements to AFLT have been realized by utilizing hybrid position location techniques, where the mobile device may employ an SPS receiver that can provide position information independent of the information derived from the signals transmitted by the base stations. Moreover, position accuracy can be improved by combining measurements derived from both SPS and AFLT systems using conventional techniques.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

A method of improving reliability in mobile device positioning includes generating, by a mobile device, position data for a device based on signaling between the mobile device and a first access point, receiving, at the mobile device from a positioning server, a first access point position reliability state associated with the first access point, determining, by the mobile device, a reliability of the position data based on the first access point position reliability state and an estimated location of the first access point, determining, by the mobile device, a threshold reliability requirement of an application associated with the mobile device, comparing, by the mobile device, the reliability of the position data to the threshold reliability requirement of the application, and providing, by the mobile device to the application, the position data of the device based on the comparison.

A method of generating reliability information includes determining, by a network entity, one or more access point characteristics associated with an access point, generating, by the network entity, a position reliability state for the access point based on the one or more access point characteristics, sending, by the network entity, the position reliability state for the access point to a mobile device, receiving, by the network entity from the mobile device, position data associated with the mobile device, and determining, by the network entity, a trustworthiness of the position data of the mobile device based on the position reliability state for the access point.

An apparatus for improving reliability in mobile device positioning includes at least one processor of a mobile device configured to generate position data for a device based on signaling between the mobile device and a first access point, and a transceiver configured to receive, from a positioning server, a first access point position reliability state associated with the first access point, wherein the at least one processor is further configured to: determine a reliability of the position data based on the first access point position reliability state and an estimated location of the first access point, determine a threshold reliability requirement of an application associated with the mobile device, compare the reliability of the position data to the threshold reliability requirement of the application, and provide, to the application, the position data of the device based on the comparison.

An apparatus for generating reliability information includes at least one processor of a network entity configured to: determine one or more access point characteristics associated with an access point, and generate a position reliability state for the access point based on the one or more access point characteristics, and a transceiver configured to: send the position reliability state for the access point to a mobile device, and receive, from the mobile device, position data associated with the mobile device, and wherein the at least one processor is further configured to determine a trustworthiness of the position data of the mobile device based on the position reliability state for the access point.

An apparatus for improving reliability in mobile device positioning includes means for generating, by a mobile device, position data for a device based on signaling between the mobile device and a first access point, means for receiving, at the mobile device from a positioning server, a first access point position reliability state associated with the first access point, means for determining, by the mobile device, a reliability of the position data based on the first access point position reliability state and an estimated location of the first access point, means for determining, by the mobile device, a threshold reliability requirement of an application associated with the mobile device, means for comparing, by the mobile device, the reliability of the position data to the threshold reliability requirement of the application, and means for providing, by the mobile device to the application, the position data of the device based on the comparison.

An apparatus for generating reliability information includes means for determining, by a network entity, one or more access point characteristics associated with an access point, means for generating, by the network entity, a position reliability state for the access point based on the one or more access point characteristics, means for sending, by the network entity, the position reliability state for the access point to a mobile device, means for receiving, by the network entity from the mobile device, position data associated with the mobile device, and means for determining, by the network entity, a trustworthiness of the position data of the mobile device based on the position reliability state for the access point.

A non-transitory computer-readable medium for improving reliability in mobile device positioning includes at least one instruction to generate, by a mobile device, position data for a device based on signaling between the mobile device and a first access point, at least one instruction to receive, at the mobile device from a positioning server, a first access point position reliability state associated with the first access point, at least one instruction to determine, by the mobile device, a reliability of the position data based on the first access point position reliability state and an estimated location of the first access point, at least one instruction to determine, by the mobile device, a threshold reliability requirement of an application associated with the mobile device, at least one instruction to compare, by the mobile device, the reliability of the position data to the threshold reliability requirement of the application, and at least one instruction to provide, by the mobile device to the application, the position data of the device based on the comparison.

A non-transitory computer-readable medium for generating reliability information includes at least one instruction to determine, by a network entity, one or more access point characteristics associated with an access point, at least one instruction to generate, by the network entity, a position reliability state for the access point based on the one or more access point characteristics, at least one instruction to send, by the network entity, the position reliability state for the access point to a mobile device, at least one instruction to receive, by the network entity from the mobile device, position data associated with the mobile device, and at least one instruction to determine, by the network entity, a trustworthiness of the position data of the mobile device based on the position reliability state for the access point.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
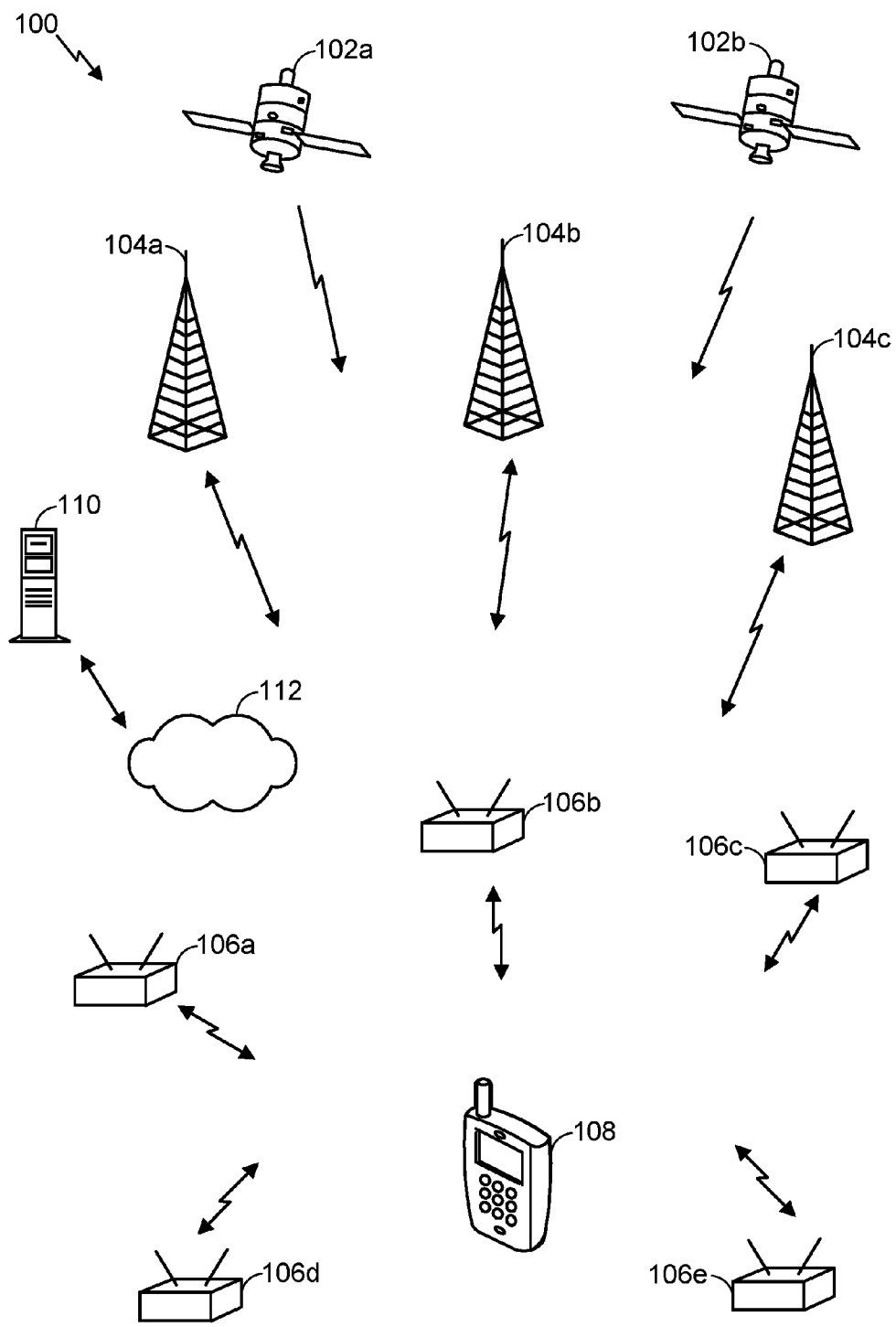
FIG. 1 illustrates an exemplary operating environment for a mobile device that can determine position using wireless techniques, according to at least one aspect of the disclosure.

Methods and systems are disclosed for improving reliability in mobile device positioning. In an embodiment, a mobile device generates position data for a device based on signaling between the mobile device and a first access point, receives, from a positioning server, a first access point position reliability state associated with the first access point, determines a reliability of the position data based on the first access point position reliability state and an estimated location of the first access point, determines a threshold reliability requirement of an application associated with the mobile device, compares the reliability of the position data to the threshold reliability requirement of the application, and provides, to the application, the position data of the device based on the comparison.

Methods and systems are further disclosed for generating reliability information. In an embodiment, a network entity determines one or more access point characteristics associated with an access point, generates a position reliability state for the access point based on the one or more access point characteristics, sends the position reliability state for the access point to a mobile device, receives, from the mobile device, position data associated with the mobile device, and determines a trustworthiness of the position data of the mobile device based on the position reliability state for the access point.

These and other aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

The terminology used herein is for the purpose of describing particular embodiments only and not to limit any embodiments disclosed herein. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

According to one aspect of the disclosure, FIG. 1 illustrates an exemplary operating environment 100 for a mobile device 108 having wireless positioning capability. The operating environment 100 may contain one or more different types of wireless communication systems and/or wireless positioning systems. In the embodiment shown in FIG. 1, one or more Satellite Positioning System (SPS) satellites 102a, 102b may be used as independent sources of position information for the mobile device 108. The mobile device 108 may include one or more dedicated SPS receivers specifically designed to receive signals for deriving geolocation information from the SPS satellites.

The operating environment 100 may also include one or more Wide Area Network Wireless Access Points (WAN-WAPs, also referred to herein simply as "cells") 104a, 104b, 104c, which may be used for wireless voice and/or data communication, and as other sources of independent position information for the mobile device 108. The WAN-WAPs 104a-104c may be part of a wide area wireless network (WWAN), which may include cellular base stations at known locations, and/or other wide area wireless systems, such as, for example, Worldwide Interoperability for Microwave Access (WiMAX) (e.g., IEEE 802.16). The WWAN may include other known network components which are not shown in FIG. 1 for simplicity. Typically, each of the WAN-WAPs 104a-104c within the WWAN may operate from fixed positions, and provide network coverage over large metropolitan and/or regional areas.

The operating environment 100 may further include one or more Local Area Network Wireless Access Points (LAN-WAPs, also referred to herein simply as "APs") 106a, 106b, 106c, 106d, 106e, which may be used for wireless voice and/or data communication, as well as other independent sources of position data. A LAN-WAPs can be part of a Wireless Local Area Network (WLAN), which may operate in buildings and perform communications over smaller geographic regions than a WWAN. Such LAN-WAPs 106a-106e may be part of, for example, Wi-Fi networks (802.11x), cellular piconets and/or femtocells, Bluetooth networks, etc.

The mobile device 108 may derive position information from any one or more of the SPS satellites 102a, 102b, the WAN-WAPs 104a-104c, and/or the LAN-WAPs 106a-106e. Each of the aforementioned systems can provide an independent estimate of the position for the mobile device 108 using different techniques. In some embodiments, the mobile device 108 may combine the solutions derived from each of the different types of access points to improve the accuracy of the position data. When deriving position using the SPS satellites 102a, 102b, the mobile device 108 may utilize a receiver specifically designed for use with the SPS satellites 102a, 102b that extracts position, using conventional techniques, from a plurality of signals transmitted by the SPS satellites 102a, 102b.

When deriving position from the WWAN, each WAN-WAP 104a-104c may take the form of base stations within a digital cellular network, and the mobile device 108 may include a cellular transceiver and processor that can exploit the base station signals to derive position. Such cellular networks may include, but are not limited to, standards in accordance with GSM, CDMA, 2G, 3G, 4G, LTE, etc. It should be understood that digital cellular networks may include additional base stations or other resources that may not be shown in FIG. 1. While the WAN-WAPs 104a-104c may actually be moveable or otherwise capable of being relocated, for illustration purposes it will be assumed that they are essentially arranged in a fixed position.

The mobile device 108 may perform position determination using known time-of-arrival (TOA) techniques such as, for example, Advanced Forward Link Trilateration (AFLT). In other embodiments, each of the WAN-WAPs 104a-104c may comprise a WiMAX wireless networking base station. In this case, the mobile device 108 may determine its position using TOA techniques from signals provided by the WAN-WAPs 104a-104c. The mobile device 108 may determine positions either in a stand-alone mode, or using the assistance of a positioning server 110 and a network 112 using TOA techniques, as will be described in more detail below. Furthermore, various embodiments may have the mobile device 108 determine position information using the WAN-WAPs 104a-104c, which may have different types. For example, some of the WAN-WAPs 104a-104c may be cellular base stations, and other WAN-WAPs 104a-104c may be WiMAX base stations. In such an operating environment, the mobile device 108 may be able to exploit the signals from each different type of WAN-WAP 104a-104c, and further combine the derived position solutions to improve accuracy.

When deriving position using the WLAN, the mobile device 108 may utilize TOA techniques with the assistance of the positioning server 110 and the network 112. The positioning server 110 may communicate to the mobile device 108 through the network 112. The network 112 may include a combination of wired and wireless networks which incorporate the LAN-WAPs 106a-106e. In one embodiment, each of the LAN-WAPs 106a-106e may be, for example, a Wi-Fi wireless access point, which is not necessarily set in a fixed position and can change location. The position of each of the LAN-WAPs 106a-106e may be stored in the positioning server 110 in a common coordinate system. In one embodiment, the position of the mobile device 108 may be determined by having the mobile device 108 receive beacon signals from each of the LAN-WAPs 106a-106e. Each beacon signal may be associated with its originating LAN-WAP 106a-106e based upon some form of identifying information that may be included in the received signal (such as, for example, a MAC address). The mobile device 108 may then sort the received beacon signals based upon signal strength, and derive the time delays associated with each of the sorted received signals. The mobile device 108 may then form a message which can include the time delays and the identifying information of each of the LAN-WAPs 106a-106e, and send the message via the network 112 to the positioning server 110. Based upon the received message, the positioning server 110 may then determine a position, using the stored locations of the relevant LAN-WAPs 106a-106e, of the mobile device 108. The positioning server 110 may generate and provide a Location Configuration Indication (LCI) message to the mobile device 108 that includes a pointer to the position of the mobile device 108 in a local coordinate system. The LCI message may also include other points of interest in relation to the location of the mobile device 108. When computing the position of the mobile device 108, the positioning server 110 may take into account the different delays which can be introduced by elements within the network 112.

The position determination techniques described herein may be used for various wireless communication networks such as a WWAN, a WLAN, a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of a WWAN, WLAN and/or WPAN.

Figure 2:
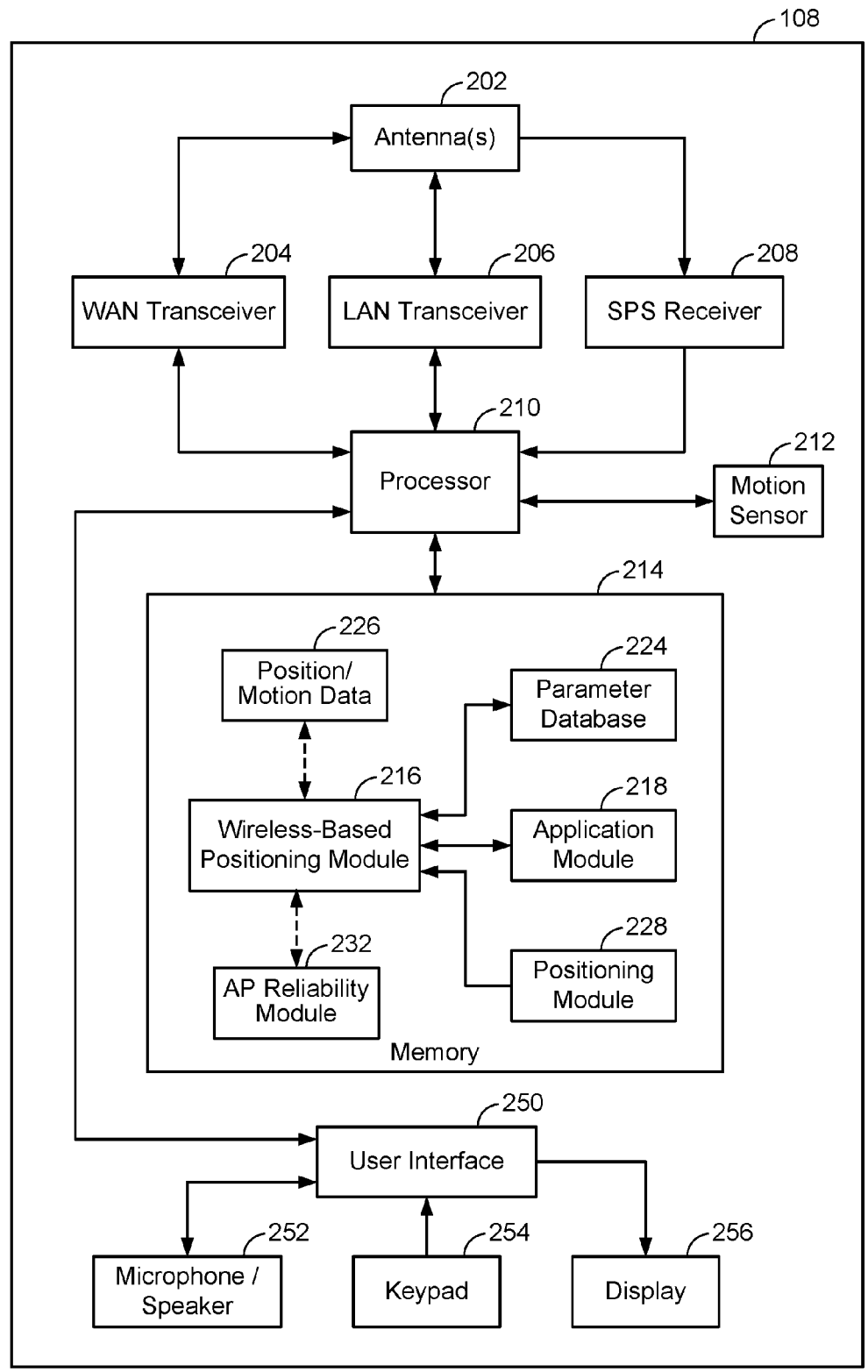
FIG. 2 illustrates an exemplary mobile device that may be used in an operating environment that can determine position using wireless techniques, according to at least one aspect of the disclosure.

FIG. 2 is a block diagram illustrating various components of the mobile device 108 according to at least one aspect of the disclosure. For the sake of simplicity, the various features and functions illustrated in the box diagram of FIG. 2 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

The mobile device 108 may include one or more wide area network (WAN) transceiver(s) 204 that may be connected to one or more antennas 202. The WAN transceiver 204 comprises suitable devices, hardware, and/or software for communicating with and/or detecting signals to/from the WAN-WAPs 104a-104c, and/or directly with other wireless devices within a network. In one aspect, the WAN transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (IEEE 802.16), etc. The mobile device 108 may also include one or more local area network (LAN) transceivers 206 that may be connected to the one or more antennas 202. The LAN transceiver 206 comprises suitable devices, hardware, and/or software for communicating with and/or detecting signals to/from the LAN-WAPs 106a-106e, and/or directly with other wireless devices within a network. In one aspect, the LAN transceiver 206 may comprise a Wi-Fi (802.11x) communication system suitable for communicating with one or more wireless access points; however in other aspects, the LAN transceiver 206 may comprise another type of local area network, personal area network, (e.g., Bluetooth). Additionally, any other type of wireless networking technologies may be used, for example, Ultra Wide Band, ZigBee, wireless USB etc.

As used herein, the abbreviated term "wireless access point" (WAP) may be used to refer to the LAN-WAPs 106a-106e and/or the WAN-WAPs 104a-104c. Specifically, in the description presented below, when the term "WAP" is used, it should be understood that embodiments may include a mobile device 108 that can exploit signals from a plurality of LAN-WAPs 106a-106e, a plurality of WAN-WAPs 104a-104c, or any combination of the two. The specific type of WAP being utilized by the mobile device 108 may depend upon the environment of operation. Moreover, the mobile device 108 may dynamically select between the various types of WAPs in order to arrive at an accurate position solution. In other embodiments, various network elements may operate in a peer-to-peer manner, whereby, for example, the mobile device 108 may be replaced with the WAP, or vice versa. Other peer-to-peer embodiments may include another mobile device (not shown) acting in place of one or more WAP.

An SPS receiver 208 may also be included in the mobile device 108. The SPS receiver 208 may be connected to the one or more antennas 202 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the position of the mobile device 108 using measurements obtained by any suitable SPS algorithm.

A motion sensor 212 may be coupled to a processor 210 to provide movement and/or orientation information which is independent of motion data derived from signals received by the WAN transceiver 204, the LAN transceiver 206, and the SPS receiver 208. By way of example, the motion sensor 212 may utilize an accelerometer (e.g., a MEMS device), a gyroscope, a geomagnetic sensor (e.g., a compass), an altimeter (e.g., a barometric pressure altimeter), and/or any other type of movement detection sensor. Moreover, the motion sensor 212 may include a plurality of different types of devices and combine their outputs in order to provide motion information. For example, the motion sensor 212 may use a combination of a multi-axis accelerometer and orientation sensors to provide the ability to compute positions in 2-D and/or 3-D coordinate systems.

The processor 210 may be connected to the WAN transceiver 204, the LAN transceiver 206, the SPS receiver 208 and the motion sensor 212. The processor 210 may include one or more microprocessors, microcontrollers, and/or digital signal processors that provide processing functions, as well as other calculation and control functionality. The processor 210 may also include memory 214 for storing data and software instructions for executing programmed functionality within the mobile device 108. The memory 214 may be on-board the processor 210 (e.g., within the same integrated circuit (IC) package), and/or the memory 214 may be external memory to the processor 210 and functionally coupled over a data bus. The processor 210 may include any form of logic suitable for performing at least the techniques provided herein. The functional details associated with aspects of the disclosure will be discussed in more detail below.

A number of software modules and data tables may reside in the memory 214 and be utilized by the processor 210 in order to manage both communications and positioning determination functionality. As illustrated in FIG. 2, the memory 214 may include and/or otherwise receive a wireless-based positioning module 216, an application module 218, a positioning module 228, and an AP reliability module 232. One should appreciate that the organization of the contents of the memory 214 as shown in FIG. 2 is merely exemplary, and as such the functionality of the modules and/or data structures may be combined, separated, and/or be structured in different ways depending upon the implementation of the mobile device 108.

The application module 218 may be a process running on the processor 210 of the mobile device 108, which requests position information from the wireless-based positioning module 216. Applications typically run within an upper layer of the software architectures, and may include Indoor Navigation, Buddy Locator, Shopping and Coupons, Asset Tracking, and Location Aware Service Discovery. The wireless-based positioning module 216 may derive the position of the mobile device 108 using information derived from time information measured from signals exchanged with a plurality of WAPs. In order to accurately determine position using time-based techniques, reasonable estimates of time delays, introduced by the processing time of each WAP, may be used to calibrate/adjust the time measurements obtained from the signals. As used herein, these time delays are referred to as "processing delays."

Calibration to further refine the processing delays of the WAPs may be performed using information obtained by the motion sensor 212. In one embodiment, the motion sensor 212 may directly provide position and/or orientation data to the processor 210, which may be stored in the memory 214 in a position/motion data module 226. In other embodiments, the motion sensor 212 may provided data which should be further processed by the processor 210 to derive information to perform the calibration. For example, the motion sensor 212 may provide acceleration and/or orientation data (single or multi-axis) which can be processed using the positioning module 228 to derive position data for adjusting the processing delays in the wireless-based positioning module 216.

After calibration, the position may then be output to the application module 218 in response to its aforementioned request. In addition, the wireless-based positioning module 216 may utilize a parameter database 224 for exchanging operational parameters. Such parameters may include the determined processing delays for each WAP, the WAPs' positions in a common coordinate frame, various parameters associated with the network, initial processing delay estimates, etc.

In other embodiments, the additional information may optionally include auxiliary position and/or motion data which may be determined from other sources besides the motion sensor 212, such as, for example, from SPS measurements. The auxiliary position data may be intermittent and/or noisy, but may be useful as another source of independent information for estimating the processing delays of the WAPs depending upon the environment in which the mobile device 108 operates.

For example, in some embodiments, data derived from the SPS receiver 208 may supplement the position data supplied by the motion sensor 212 (either directly from the position/motion data module 226 or derived by the positioning module 228). In other embodiments, the position data may be combined with data determined through additional networks using non-RTT techniques (e.g., AFLT within a CDMA network). In certain implementations, the motion sensor 212 and/or the SPS receiver 208 may provide all or part of the position/motion data without further processing by the processor 210. In some embodiments, the position/motion data may be directly provided by the motion sensor 212 and/or the SPS receiver 208 to the processor 210.

While the modules shown in FIG. 2 are illustrated in the example as being contained in the memory 214, it is recognized that in certain implementations such procedures may be provided for or otherwise operatively arranged using other or additional mechanisms. For example, all or part of the wireless-based positioning module 216, the application module 218, and/or the AP reliability module 232 may be provided in firmware. Additionally, while in this example the wireless-based positioning module 216, the application module 218, and the AP reliability module 232 are illustrated as being separate features, it is recognized, for example, that such procedures may be combined together as one procedure or perhaps with other procedures, or otherwise further divided into a plurality of sub-procedures.

The mobile device 108 may include a user interface 250 that provides any suitable interface systems, such as a microphone/speaker 252, a keypad 254, and a display 256 that allows user interaction with the mobile device 108. The microphone/speaker 252 provides for voice communication services using the WAN transceiver 204 and/or the LAN transceiver 206. The keypad 254 comprises any suitable buttons for user input. The display 256 comprises any suitable display, such as, for example, a backlit LCD display, and may further include a touch screen display for additional user input modes.

As used herein, the mobile device 108 may be any portable or movable device or machine that is configurable to acquire wireless signals transmitted from, and transmit wireless signals to, one or more wireless communication devices or networks. As shown in FIG. 1 and FIG. 2, the mobile device 108 is representative of such a portable wireless device. Thus, by way of example but not limitation, the mobile device 108 may include a radio device, a cellular telephone device, a computing device, a personal communication system (PCS) device, or other like movable wireless communication equipped device, appliance, or machine. The term "mobile device" is also intended to include devices that communicate with a personal navigation device (PND), such as by short-range wireless, infrared, wire line connection, or other connection, regardless of whether satellite signal reception, assistance data reception, and/or position-related processing occurs at the device or at the PND. Also, "mobile device" is intended to include all devices, including wireless devices, computers, laptops, tablets, etc. that are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile device."

As used herein, the term "wireless device" may refer to any type of wireless communication device which may transfer information over a network and also have position determination and/or navigation functionality. The wireless device may be any cellular mobile terminal, personal communication system (PCS) device, personal navigation device, laptop, personal digital assistant, or any other suitable mobile device capable of receiving and processing network and/or SPS signals.

Figure 3:
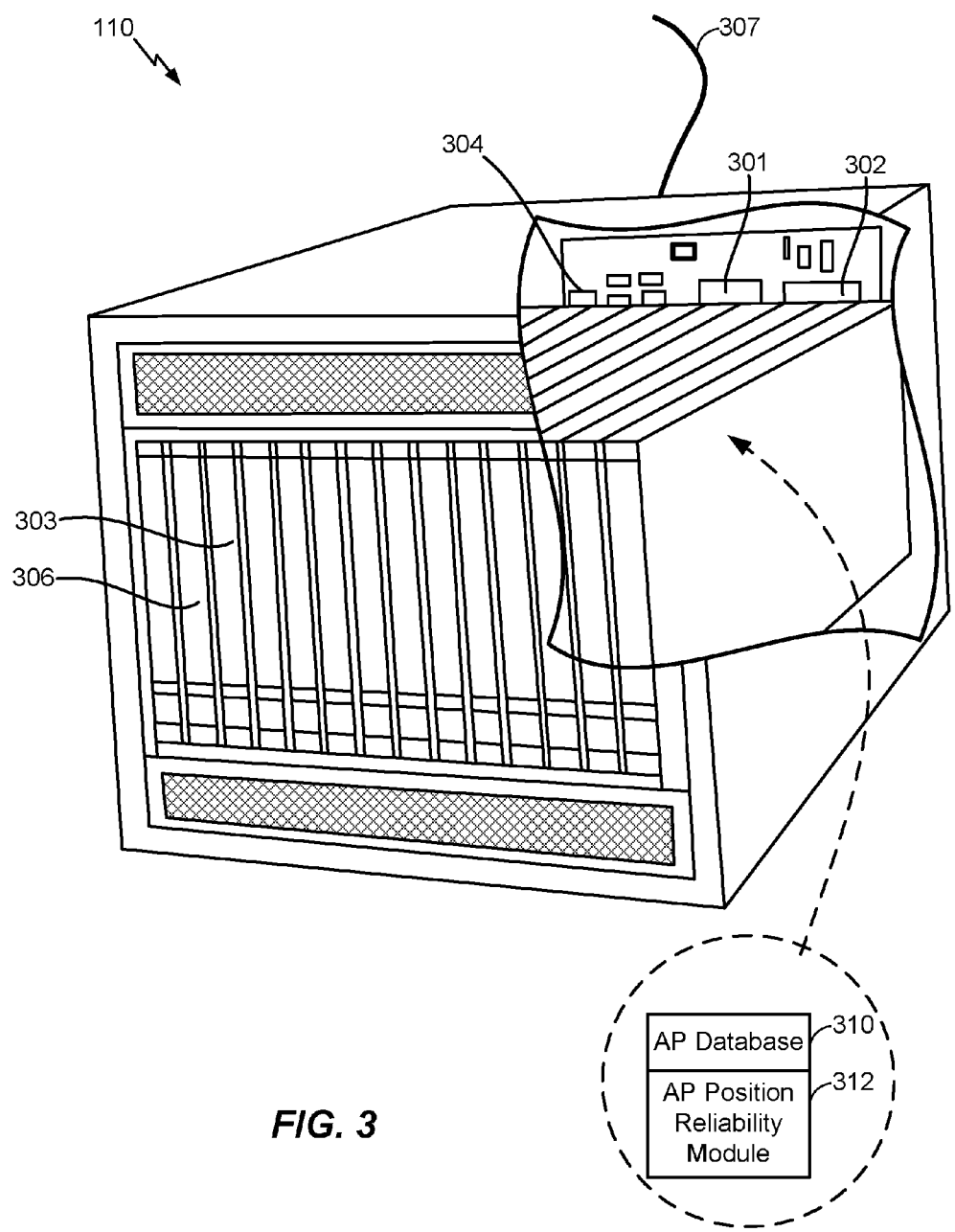
FIG. 3 illustrates a positioning server in accordance with at least one embodiment of the disclosure.

Various embodiments may be implemented on any of a variety of commercially available server devices, such as the positioning server 110 illustrated in FIG. 3. The positioning server 110 includes a processor 301 coupled to a volatile memory 302 and a large capacity nonvolatile memory, such as a disk drive 303. The positioning server 110 may also include a floppy disc drive, compact disc (CD) or DVD disc drive 306 coupled to the processor 301. The positioning server 110 may also include network access ports 304 coupled to the processor 301 for establishing data connections with a network 307, such as a local area network coupled to other broadcast system computers and servers or to the Internet. The positioning server 110 also includes an AP database 310 and an AP position reliability module 312, which are described further below.

Determining the position of the mobile device 108 using crowdsourcing, for example, based on WWAN and Wi-Fi positioning measurements received from other devices, is intrinsically insecure due to the unknown and unpredictable nature of crowdsourcing. Here, the term "crowdsourcing" includes a broader level of data collection from other devices with respect to positioning, based on guidance from the positioning server 110. The crowdsourced data could include WAP discovery data, for example, WLAN/WWAN scan data (e.g., the list of WAPs and associated measurements, such as TOA, RTT, RSSI, etc.), which may be geo-tagged (e.g., tagged with device position and time) or non-geo-tagged. The crowdsourced data may also include reliability data, that is, the other device's own position reliability estimate and any discrepancy or consistency between the server assistance information compared to what the user device actually observes. As will be discussed further herein, the positioning information from an otherwise highly reliable AP may turn out to be an outlier compared to other position sources obtained by the mobile device 108.

When the mobile device 108 obtains crowdsource-based assistance and generates a position fix, the reliability/accuracy of that position fix is unknown and could often fall into a "confidently wrong" category. Therefore, for applications dependent on a highly reliable position fix (e.g., E911), a crowdsourced position fix, which may be "typically good but sometimes could be confidently wrong," cannot be relied upon.

Accordingly, the present disclosure provides a mechanism to generate a "reliable" crowdsourced position fix based on position reliability information for nearby APs, such as the LAN-WAPs 106a-e in FIG. 1, received from a server, such as the positioning server 110 in FIG. 1. The applications on the mobile device 108 can then decide whether to use the crowdsourced position fix based on the determined reliability. For example, an E911 call would require a very high position reliability, whereas other applications may be less sensitive to the reliability.

A positioning module (e.g., wireless-based positioning module 216 in FIG. 2) selects beacon signals broadcast by the LAN-WAPs 106a-e to calculate a position fix for the mobile device 108 based on known position reliability of the corresponding LAN-WAPs 106a-e (obtained, for example, from the positioning server 110). The wireless-based positioning module 216 calculates the reliability of the position fix based on the position reliability of the LAN-WAPs 106a-e from which the beacon signals were received and the consistency among these measurements. The wireless-based positioning module 216 can then provide the position fix for the mobile device 108 and its reliability to the applications on the mobile device 108 via an application programming interface (API). The applications, depending on their reliability requirements, can decide to use the position fix, ignore the position fix, or increase the uncertainty of the position fix based on the reliability information. For example, for an E911 call, the application may decide not to use the position fix if the reliability is below a reliability requirement.

As noted above, the mobile device 108 may utilize server-generated AP position reliability information. The mobile device 108 may use beacon signals from only high to medium reliability APs of the LAN-WAPs 106a-e if there are a sufficient number of APs/beacons. The mobile device 108 can also apply a weighting to the APs/beacon signals that is proportional to their reliability in position estimation. The mobile device 108 can also detect and exclude outlier APs/beacon signals. An outlier occurs when the position estimate of the AP is away from the "ground truth," i.e., the actual geographic position of the AP, by more than, for example, 5xHEPE, i.e., PUNC@67%. "HEPE" stands for Horizontal Estimated Position Error and typically represents a 67% level of error (if Gaussian error, which corresponds to 1 sigma) and is specific to horizontal (two-dimensional) error. "PUNC" stands for Position UNCertainty and represents a three-dimensional error estimate and is typically used with various confidence levels, such as 67%, 95%, or 99%.

To detect and exclude outlier APs/beacon signals, the mobile device 108 can calculate a position fix using only high to medium reliability APs/beacon signals and compare that position fix to a position fix calculated using all available APs/beacon signals. A large discrepancy between the two position fixes would indicate the existence of outliers. As such, the mobile device 108 can use the position fix calculated from the high to medium reliability APs/beacons to exclude outlying APs/beacon signals. Alternatively, the mobile device 108 can simply use Receiver Autonomous Integrity Monitoring (RAIM) with all beacon signals, and if an outlier is detected, can remove such beacon signals based on their reliability until RAIM succeeds.

For example, when the mobile device 108 is using a Wi-Fi-based position fix, if there is only a single AP, the AP would have to have a very high reliability to be used. However, if there are two to ten APs, for example, the mobile device 108 is able to use only very high, high, and/or medium reliability APs.

The mobile device 108 may derive the reliability of its position fix from the AP position reliability information received from the positioning server 110. More specifically, the position fix reliability will reflect the AP/beacon signal reliability, as well as the ratio of the higher reliability APs/beacon signals to the lower reliability APs/beacon signals in the position fix. The position fix reliability may also reflect the status of the wireless-based positioning module 216 and the RAIM, which may include factors such as horizontal estimated position error (HEPE), estimation residual error, horizontal protection level (HPL), the number of measurement included and/or excluded versus the total measurements, the reliability of the measurements excluded (e.g., measurements detected as outliers), etc.

The mobile device 108 may also combine and/or select the position fix from different position sources based on their respective reliability. For example, the mobile device 108 may select a position fix calculated from Wi-Fi, WWAN based positioning (e.g., AFLT, OTDOA, etc.), GPS, etc., depending on which method provides greater reliability.

As noted above, the mobile device 108 may deliver the reliability of the position fix to applications along with the actual position fix. Depending on an application's reliability requirement, it can decide to ignore the position fix or to increase the uncertainty of the position fix. For E911 calls, for example, the application may not use the position fix if its reliability is below a reliability threshold. Other applications may display the position fix with different colors or different patterns depending on the reliability of the position fix.

Referring now to how the reliability of an AP of the LAN-WAPs 106a-e (referred to simply as LAN-WAP 106) is calculated (and thereby how the reliability of the beacon signal(s) from the LAN-WAP 106 are calculated), the position reliability of an AP indicates the likelihood that an estimated position of the LAN-WAP 106 is an outlier. More specifically, the position reliability of an LAN-WAP 106 is a measure of the reliability of a position estimate of the LAN-WAP 106, determined based on the expected likelihood of an outlier. As noted above, an outlier occurs when the position estimate of the LAN-WAP 106 is away from the "ground truth" by more than, for example, 5xHEPE. In other words, a reliable position fix means there is less chance of the position fix being "confidently wrong."

A position estimate is represented with the following attributes: coordinates (typically in latitude, longitude, and altitude (LLA) format), position uncertainty (e.g., HEPE)/coverage radius (only for beacon position estimates), confidence level of the position uncertainty (e.g., 67%, 95%, or 99%), and the position reliability.

Calculating the reliability of an LAN-WAP 106 adds value to the AP database 310 (e.g., it is a measure of quality for an LAN-WAP 106 in the AP database 310). It also helps in estimating high reliability position fixes for the mobile device 108 as discussed above (thereby increasing E911 location reliability, for example), such as by assisting the mobile device 108 to choose APs of the LAN-WAPs 106a-e for position fix estimation that will increase the accuracy of the position fix.

AP position reliability can also be used by Serving Mobile Location Centers (SMLCs) to provide "location for E911." The SMLCs may have databases to obtain "civic addresses" from observed MAC addresses. The AP position reliability can play a very important role in choosing an appropriate set of APs for such a database lookup.

In an embodiment, there may be five levels of position reliability: very low, low, medium, high, and very high, as shown in Table 1:

TABLE 1

| Position Reliability | Outlier Probability | Comments |
|---|---|---|
| VERY_LOW(1) | $\geq 10^{-0.5}$ | Estimated based on typically less than 10 measurements. Only applicable when no reliability is required. |
| LOW(2) | $10^{-0.5}$ to $10^{-1}$ | Estimated based on typically 10-99 measurements. Only applicable when little reliability is required. |
| MEDIUM(3) | $10^{-1}$ to $10^{-2}$ | Estimated based on typically 100-999 measurements. Applicable for the most of everyday applications including pedestrian navigation. |
| HIGH(4) | $10^{-2}$ to $10^{-3}$ | Estimated based on typically more than 1000 measurements. Applicable for high reliability applications including vehicle navigation. |
| VERY_HIGH(5) | $<10^{-3}$ | Reliable enough for E911 application. Meets high reliability condition and seen in last 7 days. |

Note that in Table 1 above, the exemplary numbers of measurements given (e.g., "less than 10 measurements," "typically 10-99 measurements," etc.) refer to a crowdsourced AP location case. These numbers would vary in other cases, for example, a cell location case.

The AP position reliability module 312 on the positioning server 110 performs an AP position reliability estimation algorithm using crowdsourced data to assess the reliability of entries in the AP database 310 for the LAN-WAPs 106a-e. The algorithm includes assessing the AP position estimation quality, with may be derived from the source type (e.g., whether the LAN-WAP 106 is geo-tagged, non-geo-tagged, or a third party AP), the position stability of the LAN-WAP 106 (e.g., the distance between the newest and previous position estimates of the LAN-WAP 106), and the position HEPE of the LAN-WAP 106.

The AP position reliability module 312 may also determine the reliability of the position of the LAN-WAP 106 based on the stability of the position of the LAN-WAP 106, the AP history, a consistency check with reliable crowdsourced data (e.g., cell location, GPS fix, neighboring APs), and third party sources. More specifically, the algorithm may cross-check with neighboring APs of the LAN-WAPs 106a-e, the WAN-WAPs 104a-c, mobile device positions (e.g., calculated using GNSS or non-GNSS), external sources (e.g., third parties), service set identifier (SSID), etc., to determine the reliability of the position of the LAN-WAP 106. The positioning server 110 may determine whether such crowdsourced data is trustworthy based on cross checking the cell ID or SSID to detect untrusted measurements, and/or space and time quantization of crowdsourced measurements to detect whether hackers are sending the data. For example, a periodic gridding scheme can be used to detect a hacker sending data having the same position for an LAN-WAP 106 some large number of times, e.g., a million times. The consistency results can promote or demote the reliability of the LAN-WAP 106.

The AP position reliability module 312 may also check the history of the LAN-WAP 106 by, for example, cross checking the data received from various clients (e.g., mobile devices, APs, etc.) with their previously uploaded data. If the estimated positions for the APs in the scan lists uploaded by the same clients show no correlation, the AP position reliability module 312 can mark the client as an untrusted client. The AP position reliability module 312 can also filter incorrect data, such as data with a large time gap between scan measurements, geo-tags, and a very high velocity. The AP position reliability module 312 can use reliable data as a consistency check, for example, to determine the ratio of outliers detected based on the consistency check as a reliability metric.

Metrics based on the measurement history of a given LAN-WAP 106 include the accumulated number of reliable and consistent measurements, the last time the LAN-WAP 106 was observed, the last time the position was estimated, the number of trusted measurements quantized in space and/or time (e.g., quantization in time: all the measurements received in a 15 minute duration can be considered as one measurement), quantization in space and time (e.g., all the measurements received in a 5 m by 5 m area in a certain duration of time can be considered as one measurement), the time of day that the LAN-WAP 106 is usually observed (e.g., if an LAN-WAP 106 is observed only in the morning and not the evening, then its reliability is low), the LAN-WAP 106 observation duration (e.g., the last time the LAN-WAP 106 was seen minus the first time the LAN-WAP 106 was seen), and the mobile AP detection history (e.g., the last time the LAN-WAP 106 was detected as being mobile, the number of total mobile detections, etc.).

Figure 4:
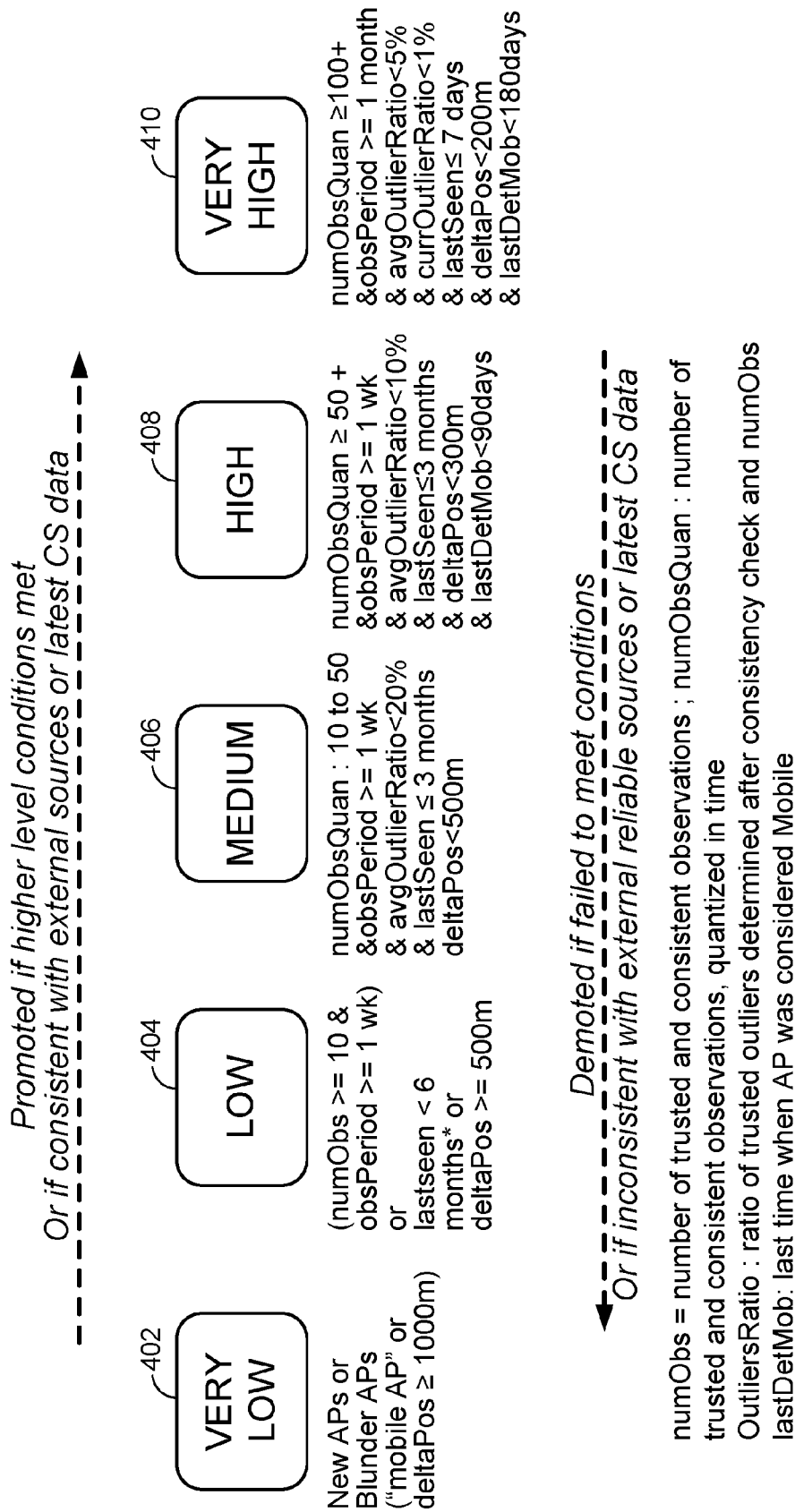
FIG. 4 illustrates an example of access point (AP) position reliability state transitions according to at least one aspect of the disclosure.

FIG. 4 illustrates an example of AP position reliability state transitions according to at least one aspect of the disclosure. As illustrated in FIG. 4, an AP position reliability state 402 of VERY LOW is assigned to new APs or "blunder APs" (e.g., mobile APs or APs that have moved more than a threshold distance, such as 1000 m).

An AP position reliability state 404 of LOW is assigned to APs that have more than a threshold number (e.g., 10) of trusted and consistent observations over an observation period longer than a threshold period of time (e.g., one week), or were last seen within a threshold period of time (e.g., six months), or have moved more than a threshold distance (e.g., 500 m).

An AP position reliability state 406 of MEDIUM is assigned to APs that have a number of trusted and consistent observations, quantized in time, within a threshold (e.g., 10 to 50) over a threshold period of time (e.g., one week), and have an average outlier ratio less than a threshold (e.g., 20%), and were last seen within a threshold period of time (e.g., three months), and have moved less than a threshold distance (e.g., 500 m).

An AP position reliability state 408 of HIGH is assigned to APs that have a number of trusted and consistent observations, quantized in time, over a threshold (e.g., 50 or more) over a threshold period of time (e.g., one week), and have an average outlier ratio less than a threshold (e.g., 10%), and were last seen within a threshold period of time (e.g., three months), and have moved less than a threshold distance (e.g., 300 m), and have a last time that the LAN-WAP 106 was considered mobile to be less than a threshold (e.g., 90 days).

An AP position reliability state 410 of VERY HIGH is assigned to APs that have a number of trusted and consistent observations, quantized in time, over a threshold (e.g., 100 or more), over a threshold period of time (e.g., one month), and have an average outlier ratio less than a threshold (e.g., 5%), and have a current outlier ratio less than a threshold (e.g., 1%), and were last seen within a threshold period of time (e.g., seven days), and have moved less than a threshold distance (e.g., 200 m), and have a last time that the LAN-WAP 106 was considered mobile to be less than a threshold (e.g., 180 days).

As illustrated in FIG. 4, an LAN-WAP 106 may be promoted from a lower position reliability state to a higher position reliability state if the conditions of the higher reliability state are met, or if such a promotion is consistent with external sources or the latest crowdsourced data. Similarly, an LAN-WAP 106 may be demoted from a higher position reliability state to a lower position reliability state if the LAN-WAP 106 fails to meet the conditions of the higher reliability state, or the higher reliability state is inconsistent with external reliable sources or the latest crowdsourced data. Typically, an LAN-WAP 106 may move up or down only one position reliability state at a time.

Figure 5:
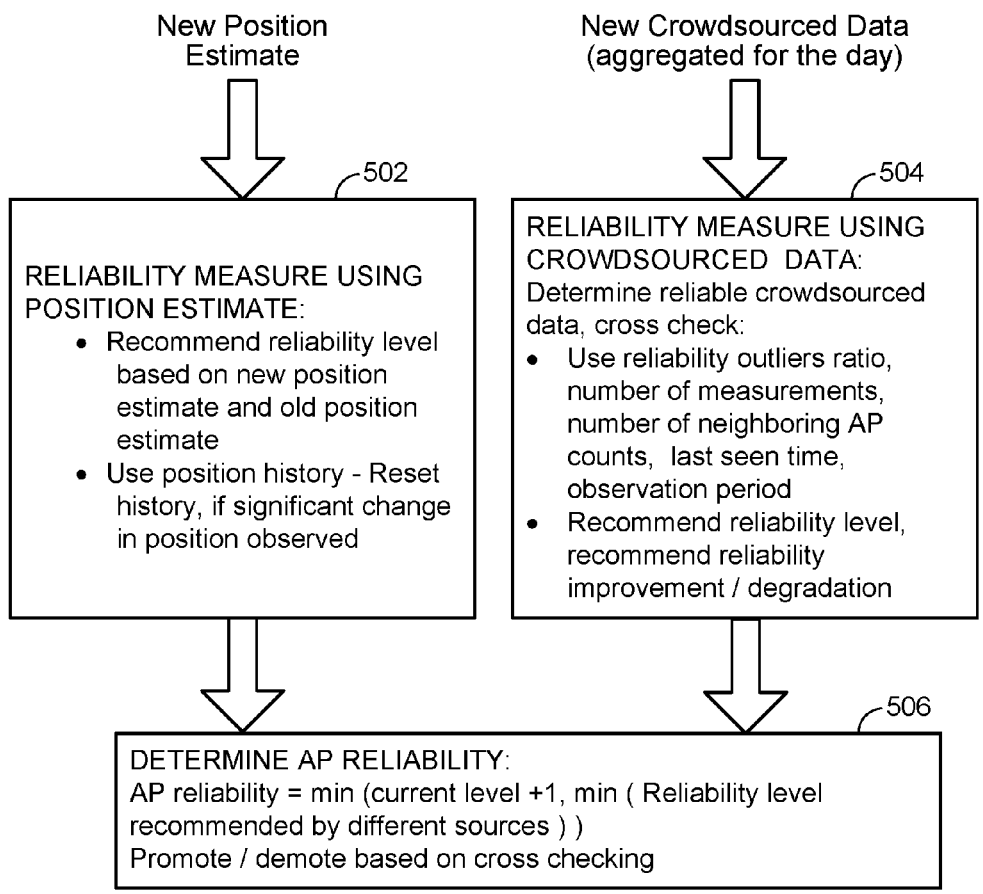
FIG. 5 illustrates an exemplary high level AP reliability determination process performed by the positioning server according to at least one aspect of the disclosure.

FIG. 5 illustrates an exemplary high level AP reliability determination process performed by the positioning server 110, for example, the AP position reliability module 312, according to at least one aspect of the disclosure. At 502, the positioning server 110/AP position reliability module 312 receives a new position estimate from the LAN-WAP 106 and calculate a reliability measure for the LAN-WAP 106 using the position estimate. Specifically, the positioning server 110/AP position reliability module 312 recommends a reliability level (e.g., one of AP position reliability states 402-410 in FIG. 4) based on the new position estimate and the last position estimate. The positioning server 110/AP position reliability module 312 uses the position history of the LAN-WAP 106, and resets the history if there is a significant change observed in the position of the LAN-WAP 106.

At 504, the positioning server 110/AP position reliability module 312 receives new crowdsourced data (which may be aggregated for the current day) and calculates a reliability measure for the LAN-WAP 106 using the crowdsourced data. Specifically, the positioning server 110/AP position reliability module 312 determines the reliability of the crowdsourced data, and cross checks it using the reliability outliers ratio, the number of measurements, the number of neighboring APs, the last seen time, and the observation period. The positioning server 110/AP position reliability module 312 recommends a reliability level for the LAN-WAP 106, and/or recommends a reliability improvement or degradation.

At 506, based on the calculations in 502 and 504, the positioning server 110/AP position reliability module 312 determines the reliability of the LAN-WAP 106. Specifically, the positioning server 110/AP position reliability module 312 determines the AP position reliability to be the minimum of the current reliability level "plus one" (e.g., if LOW, the reliability level "plus one" would be MEDIUM) and the minimum reliability level recommended by other sources. The positioning server 110/AP position reliability module 312 then promotes/demotes the reliability of the position of the LAN-WAP 106 based on cross checking.

As briefly noted above, the metrics used for determining the position reliability for an LAN-WAP 106 include the type of AP (e.g., geo-tagged, non-geo-tagged, third party), the AP state (e.g., mobile or static), the position uncertainty, and the position consistency. Regarding the type of AP, the maximum reliability may be limited for non-geo-tagged and third party APs. Regarding the state of the AP, mobile APs will be given the minimum reliability. Regarding the position consistency of the AP, this is based on the distance between the old and new position measurements and an AP position overlapping factor, which represents the extent to which the old and new positions of the LAN-WAP 106 overlap. The AP position overlapping factor is calculated using the following formula:

$$= \frac{\text{Distance between old and new position}}{\text{Scaling factor} \times \max(\text{prev. coverage area est., new coverage area est.})}$$

Note that the AP position reliability level may be reduced when a significant position change is noticed.

The final reliability level may be determined using the recommended level from all of the various sources of position information for the LAN-WAP 106. Specifically, the recommended reliability level will be based on the position estimate that is the minimum of the recommended maximum reliability levels determined based on all of the position estimate reliability metrics. The position reliability level of an LAN-WAP 106 may be stored as a statistic for that LAN-WAP 106 in the AP database 310. Note, the position reliability level may be computed only when a position estimate is available.

Table 2 illustrates an example summary of how APs may be classified based on the various factors described above:

TABLE 2

| Factors | 1 | 2 | 3 | 4 | 5 |
|---|---|---|---|---|---|
| Non-geo-tagged AP | | | Always | | |
| Detected as mobile | Always | | | | |
| AP position consistency: absolute distance between positions | >1 km | | >500 m | 500 m to 100 m | <100 m |
| AP position consistency: AP position overlapping factor | | | >=1 | | <1 |
| Position uncertainty | | | | >150 m | <150 m (reduce) |

As briefly mentioned above, the AP's 106 history may be reset when a change in the position of the LAN-WAP 106 is detected. Specifically, when a change in the position of the LAN-WAP 106 is detected, the positioning server 110/AP position reliability module 312 may reduce the position reliability for that LAN-WAP 106 to the minimum reliability level. Conditions to detect an AP position change include the LAN-WAP 106 being detected as mobile, or the change in position being greater than a threshold (e.g., 1 km), or an AP overlapping factor greater than six.

The positioning server 110/AP position reliability module 312 can measure the reliability of the position of the LAN-WAP 106 using crowdsourced data received from the LAN-WAPs 106*a-e* and/or the mobile devices served by the LAN-WAPs 106*a-e*, e.g., the mobile device 108. There are two components of crowdsourced measurements: a reference location (e.g., geographic coordinates plus cell (e.g., the WAN-WAPs 104*a-c*) location)) for a LAN-WAP 106 and a scan list of neighboring APs (from either or both the mobile device 108 and LAN-WAPs 106*a-e*). Referring to such a scan list, an AP's reliability can be derived from consistency with neighboring APs. For example, if a neighbor list includes high reliable APs and their position is consistent with this AP's, then it can confirm this AP's reliability.

The first operation for measuring the reliability of the position of a LAN-WAP 106 is to process the crowdsourced data to filter untrusted data. This includes determining the reliability for each crowdsourced measurement, that is, determining the reliability of the reference location and the reliability of the scan list. The positioning server 110/AP position reliability module 312 then filters the untrusted measurements. Next, the positioning server 110/AP position reliability module 312 cross checks the trusted crowdsourced measurements for AP position reliability. Finally, the positioning server 110/AP position reliability module 312 uses various metrics to determine the reliability of the LAN-WAP 106.

Figure 6:
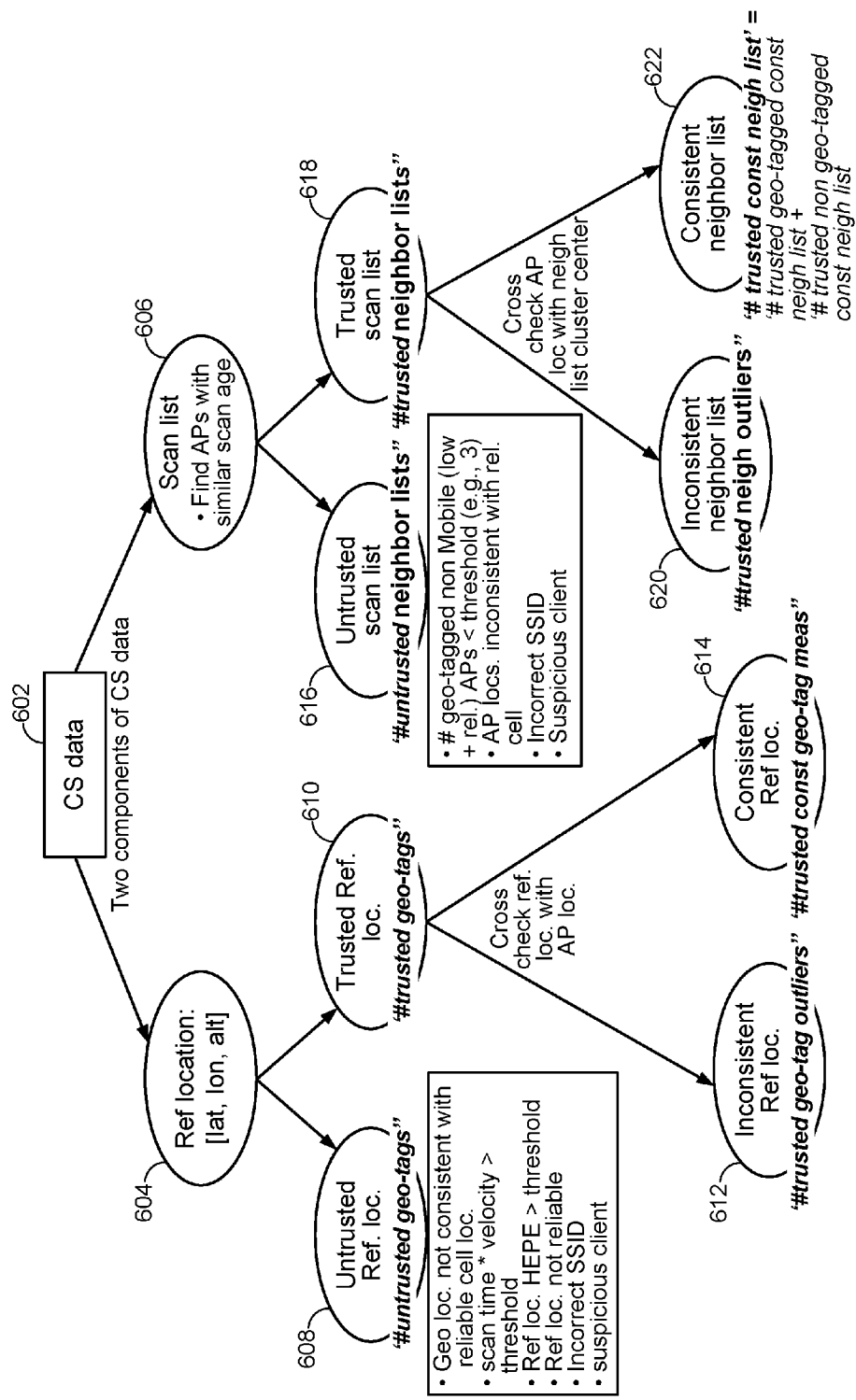
FIG. 6 illustrates an example of how crowdsourced data is data mined to filter out untrusted data according to at least one aspect of the disclosure.

FIG. 6 illustrates an example of how crowdsourced data 602 is data mined to filter out untrusted data. As noted above, the crowdsourced data 602 has two components, a reference location 604 for the LAN-WAP 106 (which may be represented in LLA format) and a scan list 606. The reference location 604 may be an untrusted reference location 608 (also referred to as an "untrusted geo-tag") or a trusted reference location 610 (also referred to as a "trusted geo-tag"). Untrusted reference location 608 may be untrusted based on the corresponding geographic location not being consistent with a reliable cell location (e.g., where the LAN-WAP 106 is within the coverage of a WAN-WAP 104), the scan time (i.e., the difference between the time the last ground truth measurement for the LAN-WAP 106 was collected and the time of the last AP scan) multiplied by the velocity of the LAN-WAP 106 being greater than a threshold, the HEPE of the reference location 604 being greater than a threshold, the reference location 604 not being reliable, an incorrect SSID, a suspicious client, or any combination thereof.

For the trusted reference location 610, the positioning server 110/AP position reliability module 312 cross checks each trusted reference location 610 to determine whether it is an inconsistent reference location 612 or a consistent reference location 614. The determination of whether a reference location 604 is inconsistent or consistent is based on the number of trusted geo-tag outliers and the number of trusted consistent geo-tag measurements, respectively. For example, the AP position reliability module 312 in FIG. 3 may compare trusted reference locations 610 with the estimated AP positions(s). Trusted reference locations 610 that are consistent with the estimated AP location(s) are referred as "trusted consistent geo-tag measurements." Trusted reference locations 610 that are not consistent with the estimated AP location(s) are referred as "trusted geo-tag outliers."

Using the scan list 606, the positioning server 110/AP position reliability module 312 can find APs with a similar scan age (i.e., the difference between the time the last ground truth measurement for the LAN-WAP 106 was collected and the time of the last AP scan). The scan list 606 may be an untrusted scan list 616 based on the number of geo-tagged non-mobile APs being less than a threshold (e.g., three), the AP locations being inconsistent with a reliable WAN-WAP 104, an incorrect SSID, a suspicious client, or any combination thereof.

For trusted scan lists 618, however, the positioning server 110/AP position reliability module 312 cross checks the location of the LAN-WAP 106 with the neighbor list cluster center (discussed further below). Based on this cross checking, the positioning server 110/AP position reliability module 312 cross checks the LAN-WAP 106's estimated position with the neighbor list cluster center and, based on this cross-checking, determines whether the neighbor list is consistent or inconsistent.

The inconsistency check referred to in FIG. 6 considers two AP positions to be inconsistent if the distance between the two corresponding position circles (representing the estimated position of the LAN-WAP 106) divided by a scaling factor of the maximum possible distance between two AP coverage centers is greater than one, where the maximum possible distance between two AP coverage area centers depends on the position sources. This is represented by the following formula:

$$\frac{\text{Distance between two position circles}}{\text{scaling factor(max possible distance between two centers)}} > 1$$

Table 3 illustrates the maximum possible distance between cells based on different exemplary position sources.

TABLE 3

| Source 1 | Source 2 | Maximum possible distance between example position sources |
|---|---|---|
| Geo-tag Location | Cell | Location HEPE + Cell Coverage Area Radius (CAR) |
| Geo-tag Location | AP | Geo-tag HEPE + AP CAR + displacement_thresh, where the displacement_thresh == distance between the geo-tag location and the mobile device location at the time of the scan (depends upon scan age and velocity; a constant value of 100 m can be used) |
| AP | Cell | AP CAR + Cell CAR |
| AP1 | AP2 | AP1 CAR + AP2 CAR |

To cross check with the neighbor AP list, as described above with reference to FIG. 6, the positioning server 110/AP position reliability module 312 determines the geo-tagged low reliability APs in the scan list 606. For geo-tagged APs of the LAN-WAPs 106a-e, the positions of the APs are estimated based on the APs' geo-tagged measurements. Note that a consistency check with non-geo-tagged APs cannot be used for the reliability estimation for geo-tagged APs because the same geo-tagged AP might have been used for the position estimation for the positions of the non-geotagged APs. Next, the positioning server 110/AP position reliability module 312 determines the neighbor list AP cluster center (or the median AP location), referred to herein as the scan list center. Finally, the positioning server 110/AP position reliability module 312 cross checks the AP position with the scan list center.

The reliability metrics referred to with respect to FIG. 6 can include an outlier ratio. Based on periodically collected statistics, where the period can be N days or M measurements, whichever occurs first, the outlier ratio can be represented as:

$$\text{Outlier Ratio} = \frac{\text{No. of reliable(i.e., trusted)outliers}}{\text{No. of reliable(i.e., trusted)observations}} =$$

$$\frac{\text{No. of reliable geo-tagged outliers} + \text{No. of reliable neighbor outliers}}{\text{No. of reliable geo-tagged measurements} + \text{No. of reliable APs in the neighbor list}}$$

A weighted outlier ratio scales down the outlier ratio if the number of reliable observations is less than the minimum reliability measurement, where the minimum reliability measurement is the minimum number of measurements required (e.g., five). The weighted outlier ratio can be represented as:

$$= \text{Outlier ratio} * \frac{\min(\text{No. of reliable observations, min. reliability meas.})}{\min. \text{ reliability measurement}}$$

Note that, as used herein, the abbreviation "No" represents the term "number," the abbreviation "min" represents the term "minimum," and the abbreviation "meas" represents the term "measurement" or "measurements."

Running statistics can be used to calculate the weighted average of the crowdsourced outlier ratio, represented as:

$$W1 * \text{old outlier ratio} + (1-W1) * \text{new outlier ratio}$$

The position of the LAN-WAP 106 is reset if the new AP position is significantly different from the previous AP position, for example, as in the case of an AP relocation.

The positioning server 110/AP position reliability module 312 may also use reliability metrics based on the number of observations, such as the number of Consistent Measurements, the number of Consistent Observations, Quantized in Time, the number of Days, the First Time Seen, the Last Time Seen, and the Observation Period. The number of Consistent Measurements equals the number of reliable consistent geo-tag measurements plus the number of APs in the reliable consistent non-geo-tagged neighbor list. The number of Consistent Observations, Quantized in Time (represented as "numObsQuan") considers all of the measurements received during the measurement quantization period, which may have a duration of "1," for example. The measurement quantization period is configurable with a default value set to, for example, 15 minutes. This gives a higher confidence even when there are fewer measurements. The number of Days (represented as "numDays") is the number of days that the LAN-WAP 106 is observed. The Observation Period (represented as "obsPeriod") is the Time Last Seen minus the Time First Seen. The positioning server 110/AP position reliability module 312 may determine the reliability of the position of an LAN-WAP 106 based on these metrics.

The positioning server 110/AP position reliability module 312 can combine the estimated reliability based on various position reliability sources. The positioning server 110/AP position reliability module 312 determines the minimum of the estimated reliability based on the position estimate metrics and the crowdsourced metrics. The position reliability of an LAN-WAP 106 can only be increased in steps of one, and is upgraded or downgraded based on the consistency check.

$$AP \text{ reliability} = \min(\text{current level} + 1, \min(\text{reliability level recommended by different sources}))$$

The position reliability of an LAN-WAP 106 is upgraded or downgraded based on cross checking. If the various position reliability sources are consistent with each other, the position reliability of the LAN-WAP 106 is promoted. If they are inconsistent with each other, the reliability of the LAN-WAP 106 is demoted. The positioning server 110/AP position reliability module 312 compares one AP's position reliability with other APs' position reliabilities. For example, a Wi-Fi scan may be uploaded with the user's GNSS fix and CellID (a.k.a. geo-tagged Wi-Fi upload). Then, the positioning server 110/AP position reliability module 312 compares the position estimate of the LAN-WAP's 106 with other APs' locations (from the same scan), CellID location(s), and user GNSS location(s). The level of promotion and demotion depends on the compared position's reliability. In other words, if an LAN-WAP 106 disagrees with a highly reliable position, that LAN-WAP's 106 position reliability will be degraded significantly. But, if the other position is not particularly reliable, then even if disagreeing, the reliability of the LAN-WAP 106 should not be demoted too much.

In an embodiment, the mobile device 108 may be able to assist the positioning server 110 in determining the reliability of an LAN-WAP 106. The mobile device 108 can give feedback to the positioning server 110 regarding AP position reliability, such as "this high reliable AP is really reliable," "this low reliability AP is looking reliable—promote its reliability," "this high reliability AP is looking wrong—reduce its reliability," etc.

This mobile device feedback addresses various server limitations. For example, the positioning server 110 uses information from multiple users to decide the position reliability of APs. However, if the LAN-WAP 106 is located in a less crowdsourced area, then the positioning server 110 cannot determine much about its reliability. Similarly, if the position of the LAN-WAP 106 position suddenly changes, the positioning server 110 may not be able to reduce its reliability immediately. In contrast, the mobile device 108 has information from many sources that are not available to the positioning server 110. For example, the mobile device 108 is aware of the location information available from other position sources (e.g., Bluetooth®), and the mobile device 108 can more accurately relate new position estimates with old position estimates by using sensor data and the like. Thus, if the position of the LAN-WAP 106 position is incorrect, then the mobile device 108 can give immediate feedback to the positioning server 110. Similarly, if the mobile device 108 is highly confident about the LAN-WAP's 106 position, then it can send feedback to the positioning server 110.

To assist the positioning server 110, the mobile device 108, specifically, the AP reliability module 232, will analyze the reliability of the LAN-WAPs 106a-e with which it comes in contact and send feedback about those APs to the positioning server 110. If an AP's 106 position reliability is low (as received by the mobile device 108 form the positioning server 110), but its position is highly consistent with other position sources available to the mobile device 108, and/or if this LAN-WAP 106 is noticed multiple times, then the AP reliability module 232 can cause the mobile device 108 to send this information to the positioning server 110 as feedback. Similarly, if an LAN-WAP's 106 position (as received by the mobile device 108 from the positioning server 110) is not consistent with other reliable position sources available to the mobile device 108, then it can send a message to the positioning server 110 to reduce that LAN-WAP's 106 position reliability. Further, if the mobile device 108/AP reliability module 232 detects that a highly reliable LAN-WAP 106 (as received by the mobile device 108 form the positioning server 110) always looks like a position outlier, then it can ask the positioning server 110 to reduce its reliability.

The mobile device 108 utilizes a mobile-to-server protocol to communicate with the positioning server 110. The mobile device 108 can send the reliability of its estimated position fix (optionally including its GNSS fix) and both horizontal and vertical position reliability. Optionally, the mobile device 108 can increase the position uncertainty when reliability is low, which can be implemented when a separate field for reliability is not available.

The mobile device 108 can also send feedback about an AP's position reliability to the positioning server 110. The mobile device 108/AP reliability module 232 may observe, for example, whether the AP's position (as received from the positioning server 110) is inconsistent with the mobile device's 108 GPS position, cell ID, or past mobile device position estimates. The mobile device 108/AP reliability module 232 may also determine whether the LAN-WAP's 106 position is inconsistent with location information available from other technologies, e.g. Bluetooth®, etc.

The positioning server 110 can utilize a server-to-mobile protocol to communicate with the mobile device 108. The positioning server 110 can send horizontal and vertical position reliability for each LAN-WAP 106 to the mobile device 108. Reliability can be in the form of an enumeration, an absolute probability of the LAN-WAP 106 being an outlier, or a confidence in percent.

There are a number of advantages to using AP position reliability. For example, the size of the AP database 310 can be reduced based on reliability by sending only high to medium reliability APs to the mobile device 108 in high density areas. Since low reliability APs are APs with unstable position estimates or APs that are not observed often, they might not be very useful for the mobile device 108. The reduction in size of the AP database 310 reduces the bandwidth required to transmit information in the AP database 310 to the mobile device 108.

Another advantage is the use of high reliability beacons for non-geo-tagged beacon discovery (position estimation). More specifically, non-geo-tagged AP position is estimated based on geo-tagged AP positions, and the mobile device 108 may give greater weight to higher reliability APs while estimating its position. The filtering of untrusted measurements can also help in improving position accuracy.

Figure 7:
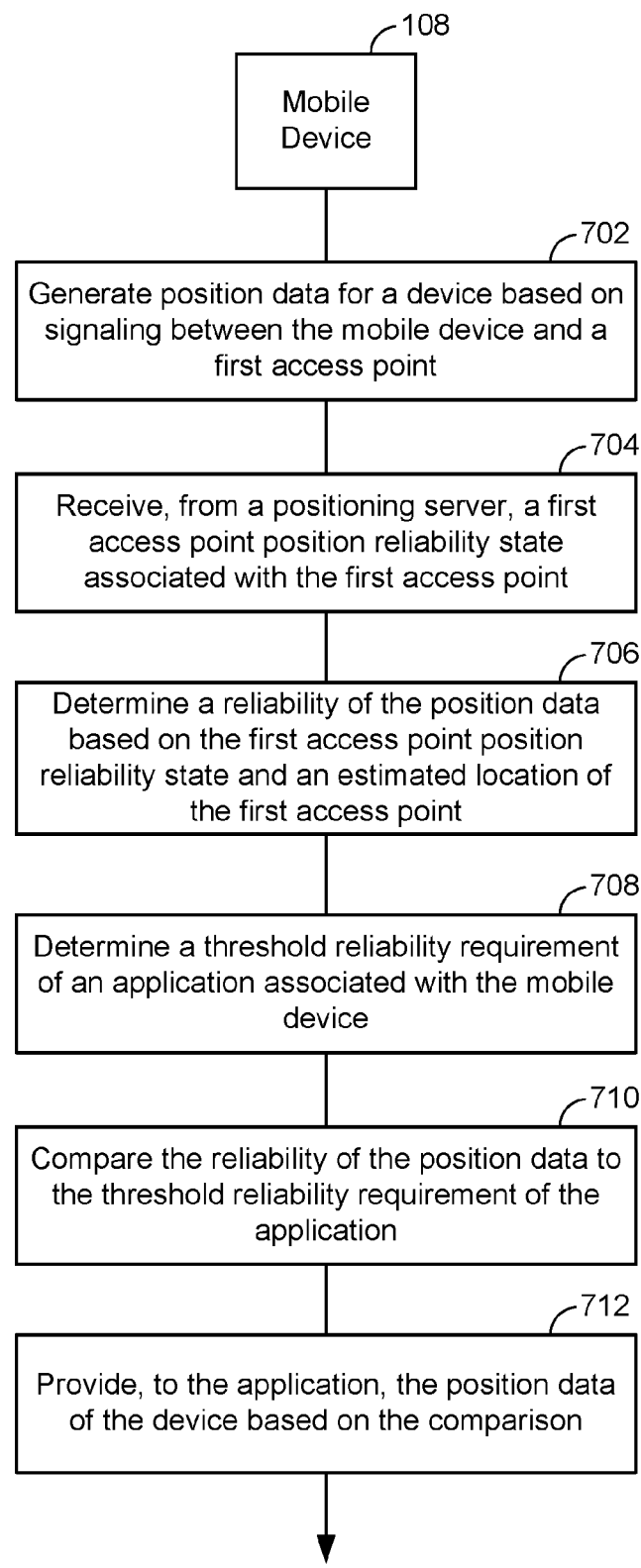
FIG. 7 illustrates an exemplary flow for improving reliability in mobile device positioning according to at least one aspect of the disclosure.

FIG. 7 illustrates an exemplary flow for improving reliability in mobile device positioning according to at least one aspect of the disclosure. The flow illustrated in FIG. 7 may be performed by the mobile device 108.

At 702, the mobile device generates position data for a device based on signaling between the mobile device 108 and a first access point (e.g., LAN-WAP 106). In an embodiment, the position data of the device comprises a position of the mobile device. In an alternative embodiment, the position data of the device comprises the estimated location of the first access point.

At 704, the mobile device 108 receives, from a positioning server, a first access point position reliability state associated with the first access point.

At 706, the mobile device 108 determines a reliability of the position data based on the first access point position reliability state and an estimated location of the first access point.

At 708, the mobile device 108 determines a threshold reliability requirement of an application associated with the mobile device.

At 710, the mobile device 108 compares the reliability of the position data to the threshold reliability requirement of the application.

At 712, the mobile device 108 provides, to the application, the position data of the device based on the comparison.

Although not illustrated in FIG. 7, in an embodiment, operation 702 may include generating a plurality of sets of position data based on signaling between the mobile device 108 and a corresponding plurality of access points (e.g., LAN-WAPs 106a-e), the plurality of access points comprising the first access point. Further, operation 704 may include receiving a plurality of access point position reliability states, the plurality of access point position reliability states including the first access point position reliability state. Each access point of the plurality of access points may be associated with an access point position reliability state of the plurality of access point position reliability states. In this embodiment, the flow may further include assigning, by the mobile device 108, a weight to each of the plurality of sets of position data based on the access point position reliability state of the corresponding access point and determining consistency between the plurality of sets of position data. The flow may further include determining, by the mobile device 108, a position of the mobile device 108 based on the plurality of sets of position data, the assigned weights, and the consistency between the plurality of sets of position data.

In an aspect, determining the consistency between the plurality of sets of position data may include determining, by the mobile device 108, a first position of the mobile device 108 using only ones of the plurality of access points having access point position reliability states above a threshold, and determining a second position of the mobile device 108 using all of the plurality of access points. In an aspect, based on a difference between the first position of the mobile device 108 and the second position of the mobile device 108 being greater than a threshold, the mobile device 108 providing the position data of the device to the application includes providing the first position of the mobile device 108 to the application.

Figure 8:
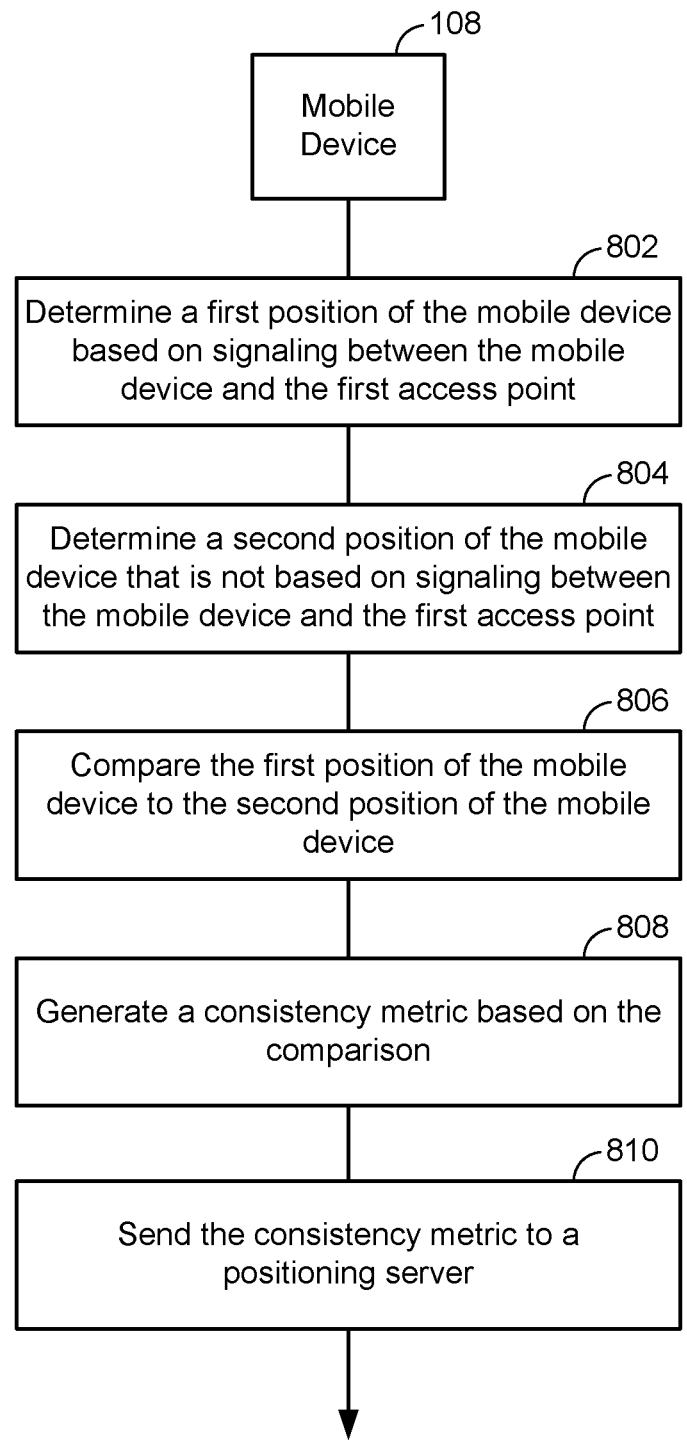
FIG. 8 illustrates an exemplary flow for improving reliability in mobile device positioning according to at least one aspect of the disclosure.

FIG. 8 illustrates an exemplary flow for improving reliability in mobile device positioning according to at least one aspect of the disclosure. The flow illustrated in FIG. 8 may be performed by the mobile device 108.

At 802, the mobile device 108 determines a first position of the mobile device 108 based on signaling between the mobile device 108 and a first access point (e.g., LAN-WAP 106).

At 804, the mobile device 108 determines a second position of the mobile device 108 that is not based on signaling between the mobile device 108 and the first access point.

At 806, the mobile device 108 compares the first position of the mobile device 108 to the second position of the mobile device 108.

At 808, the mobile device 108 generates a consistency metric based on the comparison of the first position of the mobile device 108 to the second position of the mobile device 108.

At 810, the mobile device 108 sends the consistency metric to the positioning server.

In an embodiment, based on the comparison of the first position of the mobile device 108 to the second position of the mobile device 108 (operation 806) indicating that the first position is within a threshold distance of the second position and the first access point position reliability state being below a threshold, the consistency metric indicates that the positioning server 110 should increase the first access point position reliability state to a higher access point position reliability state.

In an embodiment, based on the comparison the first position of the mobile device 108 to the second position of the mobile device 108 (operation 806) indicating that the first position is greater than a threshold distance from the second position and the first access point position reliability state being above a threshold, the consistency metric indicates that the positioning server 110 should decrease the first access point position reliability state to a lower access point position reliability state.

In an aspect, the first access point position reliability state may include one of VERY LOW, LOW, MEDIUM, HIGH, or VERY HIGH.

Figure 9:
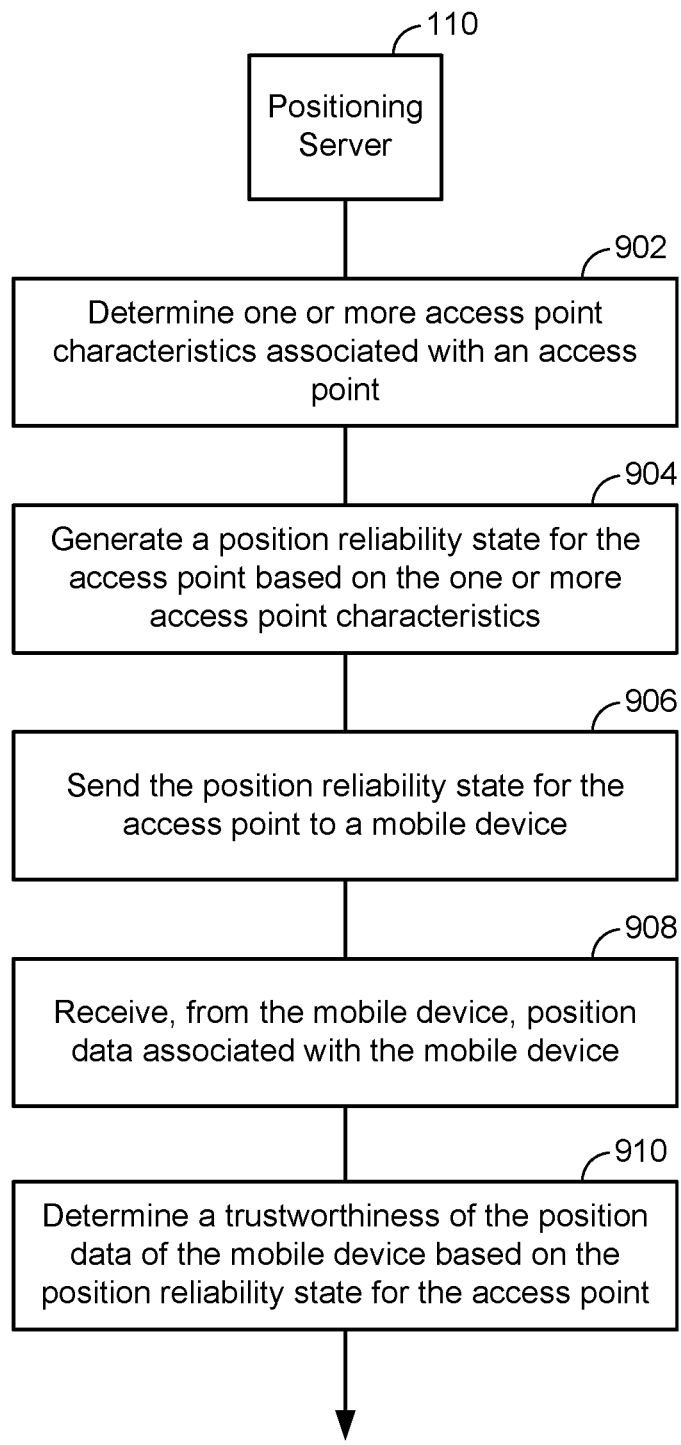
FIG. 9 illustrates an exemplary flow for generating reliability information according to at least one aspect of the disclosure.

FIG. 9 illustrates an exemplary flow for generating reliability information according to at least one aspect of the disclosure. The flow illustrated in FIG. 9 may be performed by a network entity, such as the positioning server 110.

At 902, the network entity determines one or more access point characteristics associated with an access point.

In an embodiment, the one or more access point characteristics may include a type of the access point, a status of the access point, a consistency metric received from the mobile device 108 indicating a result of a comparison of a first position of the mobile device 108 generated by the mobile device 108 based on signaling between the mobile device 108 and the access point to a second position of the mobile device 108 generated by the mobile device 108 not based on signaling between the mobile device 108 and the access point, a consistency metric indicating a distance between a current position estimate for the access point and a previous position estimate for the access point, or any combination thereof. In an aspect, a method used for access point location estimation is one of geo-tagged, non-geo-tagged, or third-party, and wherein the status of the access point is one of stationary or mobile. A geo-tagged method for access point location estimation may indicate that the current position estimate for the access point is estimated based on the first position of the mobile device 108, and a non-geo-tagged method for access point location estimation may indicate that the current position estimate for the access point is estimated based on estimated locations of access points neighboring the access point.

In an embodiment, the one or more access point characteristics may include a position stability of the access point indicating a distance between a current position estimate for the access point and a previous position estimate for the access point, a horizontal estimated position error (HEPE) for the access point, or any combination thereof.

At 904, the network entity generates a position reliability state for the access point based on the one or more access point characteristics. In an aspect, generating the position reliability state for the access point may be based on cross checking a position of the access point with positions of neighboring access points, positions of associated base stations, a position of the access point generated by the mobile device 108 based on signaling other than between the mobile device 108 and the access point, service set identifier (SSID), or any combination thereof.

In another aspect, generating the position reliability state for the access point may be based on a measurement history of the access point. In that case, the measurement history of the access point may include an accumulation of a number of reliable and consistent measurements of a position of the access point, a last time the access point was observed, a last time the position of the access point was estimated, a number of trusted measurements from the access point quantized in space and/or time, a time of day the access point is usually observed, a duration of time the access point is observed, a history of detection of the access point where the access point is a mobile access point, or any combination thereof.

In yet another aspect, generating the position reliability state for the access point may include filtering, by the network entity, untrusted measurements from the access point.

At 906, the network entity sends the position reliability state for the access point to the mobile device 108.

At 908, the network entity receives, from the mobile device 108, position data associated with the mobile device 108.

At 910, the network entity determines a trustworthiness of the position data of the mobile device 108 based on the position reliability state for the access point.

Although not illustrated in FIG. 9, the flow may further include reducing, by the network entity, the position reliability state of the access point based on a change in a position of the access point detected by the network entity.

Figure 10:
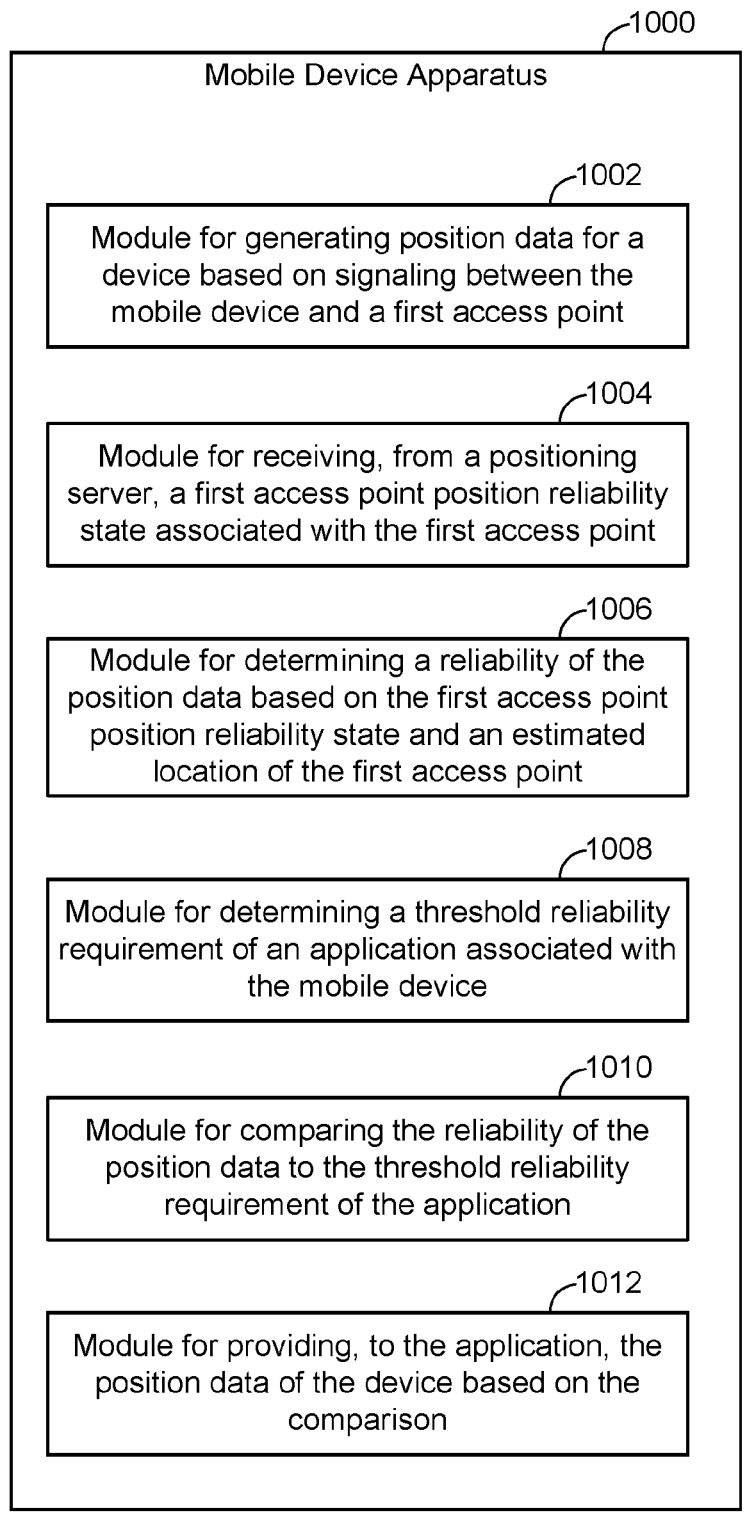
FIGS. 10-12 are other simplified block diagrams of several sample aspects of apparatuses configured to support communication as taught herein.

FIG. 10 illustrates an example mobile device apparatus 1000 represented as a series of interrelated functional modules. A module for generating 1002 may correspond at least in some aspects to, for example, a processing system, such as processor 210 in conjunction with wireless-based positioning module 216, position/motion data module 226, and/or positioning module 228 in FIG. 2, as discussed herein. A module for receiving 1004 may correspond at least in some aspects to, for example, a communication device, such as antenna(s) 202 in conjunction with WAN transceiver 204 and/or LAN transceiver 206 in FIG. 2, as discussed herein. A module for determining 1006 may correspond at least in some aspects to, for example, a processing system, such as processor 210 in conjunction with wireless-based positioning module 216, parameter database 224, position/motion data module 226, positioning module 228, and/or AP reliability module 232 in FIG. 2, as discussed herein. A module for determining 1008 may correspond at least in some aspects to, for example, a processing system, such as processor 210 in conjunction with application module 218 and/or parameter database 224 in FIG. 2, as discussed herein. A module for comparing 1010 may correspond at least in some aspects to, for example, a processing system, such as processor 210 in conjunction with application module 218 and/or AP reliability module 232 in FIG. 2, as discussed herein. A module for providing 1012 may correspond at least in some aspects to, for example, a processing system, such as processor 210 in conjunction with application module 218 in FIG. 2, as discussed herein.

Figure 11:
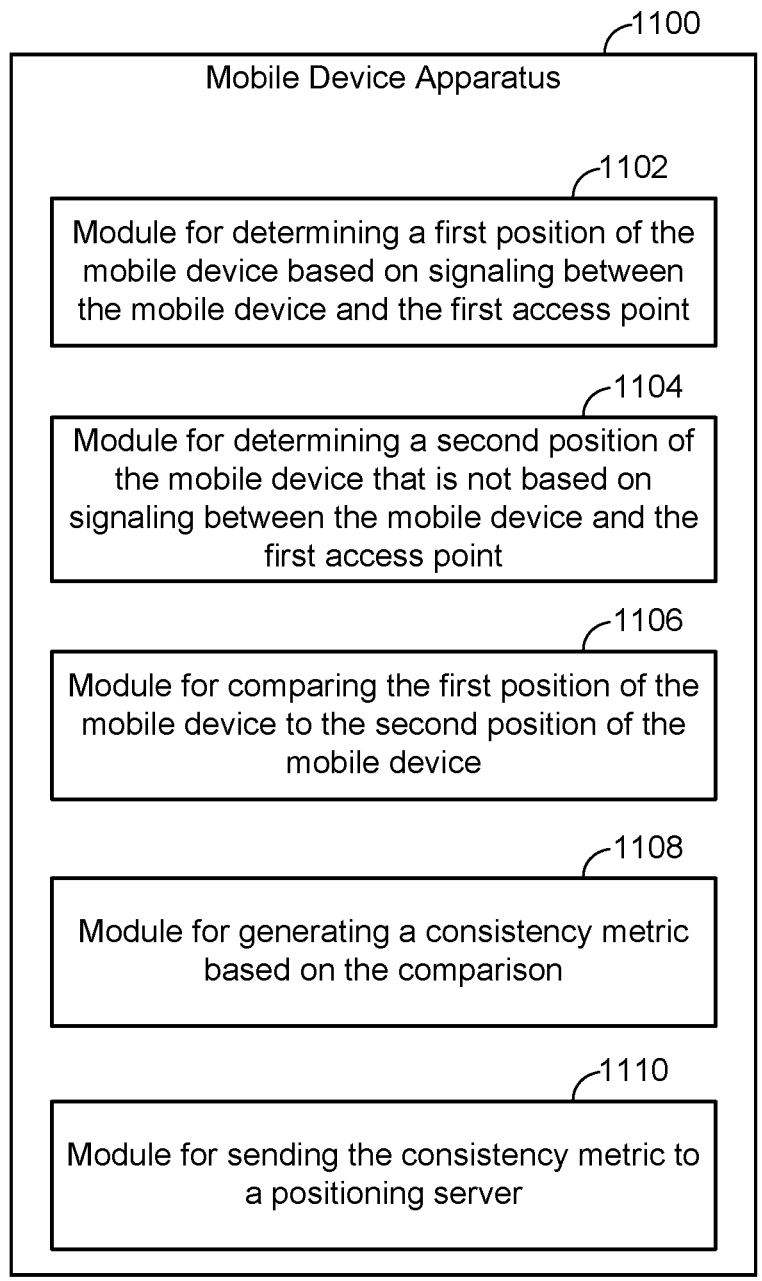

FIG. 11 illustrates an example mobile device apparatus 1100 represented as a series of interrelated functional modules. A module for determining 1102 may correspond at least in some aspects to, for example, a processing system, such as processor 210 in conjunction with wireless-based positioning module 216, position/motion data module 226, and/or positioning module 228 in FIG. 2, as discussed herein. A module for determining 1104 may correspond at least in some aspects to, for example, a processing system, such as processor 210 in conjunction with wireless-based positioning module 216, position/motion data module 226, and/or positioning module 228 in FIG. 2, as discussed herein. A module for comparing 1106 may correspond at least in some aspects to, for example, a processing system, such as processor 210 in conjunction with wireless-based positioning module 216, position/motion data module 226, and/or positioning module 228 in FIG. 2, as discussed herein. A module for generating 1108 may correspond at least in some aspects to, for example, a processing system, such as processor 210 in conjunction with wireless-based positioning module 216, parameter database 224, position/motion data module 226, and/or positioning module 228 in FIG. 2, as discussed herein. A module for sending 1110 may correspond at least in some aspects to, for example, a communication device, such as antenna(s) 202 in conjunction with WAN transceiver 204 and/or LAN transceiver 206 in FIG. 2, as discussed herein.

Figure 12:
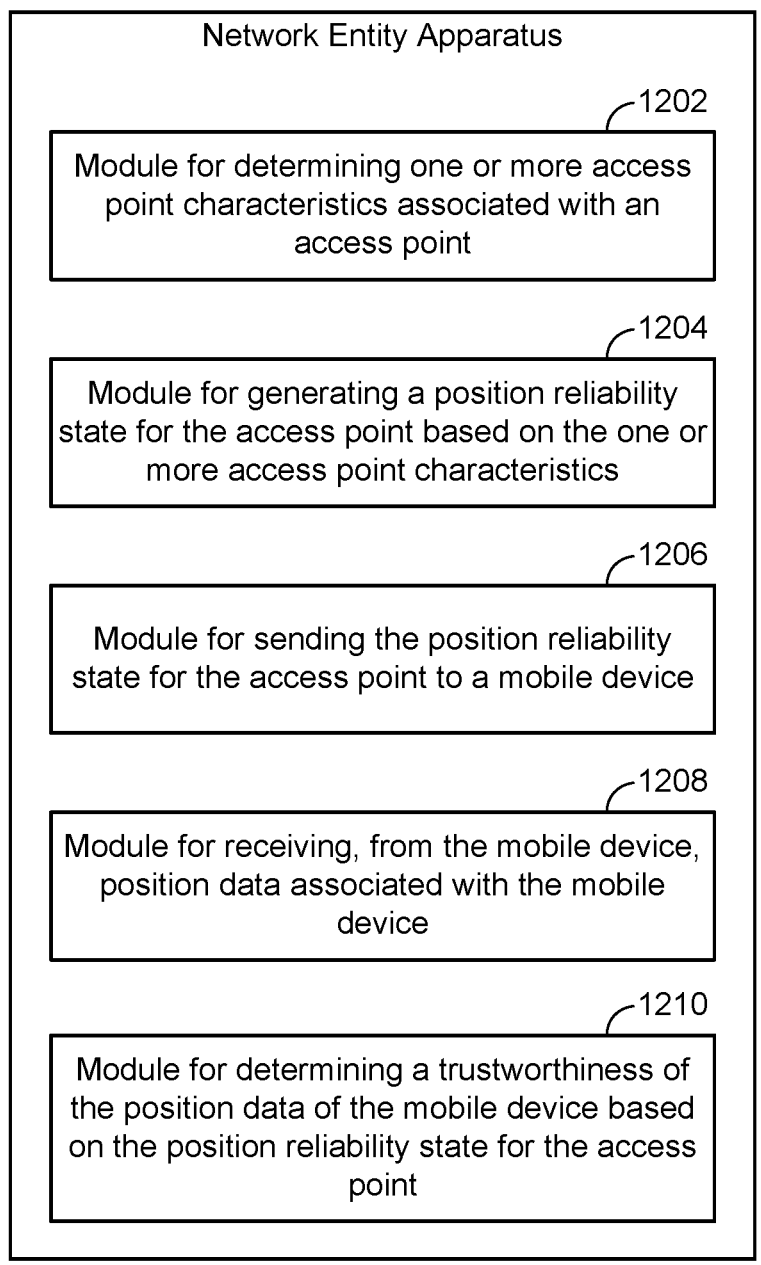

FIG. 12 illustrates an example network entity apparatus 1200 represented as a series of interrelated functional modules. A module for determining 1202 may correspond at least in some aspects to, for example, a processing system, such as processor 301 in FIG. 3, as discussed herein. A module for generating 1204 may correspond at least in some aspects to, for example, a processing system, such as processor 301 in conjunction with AP position reliability module 312 in FIG. 3, as discussed herein. A module for sending 1206 may correspond at least in some aspects to, for example, a communication device, such as network access ports 304 in FIG. 3, as discussed herein. A module for receiving 1208 may correspond at least in some aspects to, for example, a communication device, such as network access ports 304 in FIG. 3, as discussed herein. A module for determining 1210 may correspond at least in some aspects to, for example, a processing system, such as processor 301 in conjunction with AP position reliability module 312 in FIG. 3, as discussed herein.

The functionality of the modules of FIGS. 10-12 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 10-12, as well as other components and functions described herein, may be implemented using any suitable means. Such means also may be implemented, at least in part, using corresponding structure as taught herein. For example, the components described above in conjunction with the "module for" components of FIGS. 10-12 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of improving reliability in mobile device positioning, comprising:
   generating, by a mobile device, position data for a device based on signaling between the mobile device and a first access point;
   receiving, at the mobile device from a positioning server, a first access point position reliability state associated with the first access point;
   determining, by the mobile device, a reliability of the position data based on the first access point position reliability state and an estimated location of the first access point;
   determining, by the mobile device, a threshold reliability requirement of an application associated with the mobile device;
   comparing, by the mobile device, the reliability of the position data to the threshold reliability requirement of the application;
   providing, by the mobile device to the application, the position data of the device based on the comparison;
   wherein the position data of the device comprises a first position of the mobile device, the method further comprising:
   determining, by the mobile device, a second position of the mobile device that is not based on signaling between the mobile device and the first access point;
   comparing, by the mobile device, the first position of the mobile device to the second position of the mobile device;
   generating, by the mobile device, a consistency metric based on the comparison of the first position of the mobile device to the second position of the mobile device, wherein the consistency metric is based on the measurement history of a given Local Area Network Wireless Access Point (LAN-WAP) including an accumulated number of reliable and consistent measurements;
   indicating that the first position is within a threshold distance of the second position and the first access point position reliability state is below a threshold, wherein the consistency metric indicates that the positioning server should increase the first access point position reliability state to a higher access point position reliability state; and
   sending, by the mobile device, the consistency metric to the positioning server.

2. The method of claim 1, wherein the position data of the device comprises a position of the mobile device.

3. The method of claim 1, wherein the position data of the device comprises the estimated location of the first access point.

4. The method of claim 1, further comprising:
   generating, by the mobile device, a plurality of sets of position data based on signaling between the mobile device and a corresponding plurality of access points, the plurality of access points comprising the first access point;
   receiving, at the mobile device, a plurality of access point position reliability states, the plurality of access point position reliability states including the first access point position reliability state, wherein each access point of the plurality of access points is associated with an access point position reliability state of the plurality of access point position reliability states;

assigning, by the mobile device, a weight to each of the plurality of sets of position data based on the access point position reliability state of the corresponding access point; and determining, by the mobile device, consistency between the plurality of sets of position data.

5. The method of claim 4, further comprising:

determining, by the mobile device, a position of the mobile device based on the plurality of sets of position data, the assigned weights, and the consistency between the plurality of sets of position data.

6. The method of claim 4, wherein determining the consistency between the plurality of sets of position data comprises:

determining, by the mobile device, a first position of the mobile device using only ones of the plurality of access points having access point position reliability states above a threshold; and determining, by the mobile device, the second position of the mobile device using all of the plurality of access points, wherein, based on a difference between the first position of the mobile device and the second position of the mobile device being greater than a threshold, providing the position data of the device to the application comprises providing the first position of the mobile device to the application.

7. The method of claim 1, wherein, based on the comparison of the first position of the mobile device to the second position of the mobile device indicating that the first position is greater than the threshold distance from the second position and the first access point position reliability state is above the threshold, the consistency metric indicates that the positioning server should decrease the first access point position reliability state to a lower access point position reliability state.

8. The method of claim 1, wherein the first access point position reliability state comprises one of VERY LOW, LOW, MEDIUM, HIGH, or VERY HIGH.

9. An apparatus for improving reliability in mobile device positioning, comprising:

at least one processor of a mobile device configured to generate position data for a device based on signaling between the mobile device and a first access point; and a transceiver configured to receive, from a positioning server, a first access point position reliability state associated with the first access point, wherein the at least one processor is further configured to:

determine a reliability of the position data based on the first access point position reliability state and an estimated location of the first access point, determine a threshold reliability requirement of an application associated with the mobile device, compare the reliability of the position data to the threshold reliability requirement of the application, and provide, to the application, the position data of the device based on the comparison;

wherein the position data of the device comprises a first position of the first position of the mobile device, and wherein the at least one processor is further configured to:

determine a second position of the mobile device that is not based on signaling between the mobile device and the first access point;

compare the first position of the mobile device to the second position of the mobile device;

generate a consistency metric based on the comparison of the first position of the mobile device to the second position of the mobile device; wherein the consistency metric is based on the measurement history of a given Local Area Network Wireless Access Point (LAN-WAP) including an accumulated number of reliable and consistent measurements; and indicate that the first position is within a threshold distance of the second position and the first access point position reliability state is below a threshold, wherein the consistency metric indicates that the positioning server should increase the first access point position reliability state to a higher access point position reliability state; and wherein the transceiver is further configured to send the consistency metric to the positioning server.

10. The apparatus of claim 9, wherein the position data of the device comprises a position of the mobile device.

11. The apparatus of claim 9, wherein the position data of the device comprises the estimated location of the first access point.

* * * * *